(12) United States Patent
Papp, III et al.

(10) Patent No.: US 7,843,843 B1
(45) Date of Patent: Nov. 30, 2010

(54) ADAPTIVE, APPLICATION-AWARE SELECTION OF DIFFERNTIATED NETWORK SERVICES

(75) Inventors: Albert L. Papp, III, Mountain View, CA (US); Guy Riddle, Los Gatos, CA (US); Li Fang, San Jose, CA (US); Michael Robert Morford, Saratoga, CA (US)

(73) Assignee: Packeteer, Inc., Cupertino, CA (US)

( * ) Notice: Subject to any disclaimer, the term of this patent is extended or adjusted under 35 U.S.C. 154(b) by 986 days.

(21) Appl. No.: 11/096,310

(22) Filed: Mar. 31, 2005

Related U.S. Application Data

(63) Continuation-in-part of application No. 10/812,198, filed on Mar. 29, 2004, now Pat. No. 7,496,661.

(51) Int. Cl.
*G01R 31/08* (2006.01)
*H04L 12/28* (2006.01)
*G06F 15/173* (2006.01)

(52) U.S. Cl. .................. 370/252; 370/395.42; 709/224

(58) Field of Classification Search ...... 370/230–235.1, 370/395.3, 420, 252, 389, 392, 395.2, 395.21, 370/395.42, 395.43, 395; 709/223–226, 709/229, 232, 233
See application file for complete search history.

(56) References Cited

U.S. PATENT DOCUMENTS

| 5,793,976 | A | 8/1998 | Chen et al. .................. 709/224 |
| 6,560,230 | B1 * | 5/2003 | Li et al. .................. 370/395.42 |
| 6,636,509 | B1 * | 10/2003 | Hughes ...................... 370/389 |
| 6,678,248 | B1 * | 1/2004 | Haddock et al. ............ 370/235 |
| 7,010,611 | B1 * | 3/2006 | Wiryaman et al. .......... 709/232 |
| 7,133,360 | B2 | 11/2006 | Le Gouriellec et al. ..... 370/229 |
| 2002/0120745 | A1 * | 8/2002 | Oishi et al. ................. 709/226 |
| 2003/0005145 | A1 * | 1/2003 | Bullard ...................... 709/238 |
| 2003/0174649 | A1 * | 9/2003 | Shankar et al. ............ 370/235 |
| 2003/0227876 | A1 * | 12/2003 | Ruutu et al. ................ 370/252 |
| 2004/0064577 | A1 * | 4/2004 | Dahlin et al. ............... 709/235 |

* cited by examiner

*Primary Examiner*—Aung S Moe
*Assistant Examiner*—Redentor M Pasia
(74) *Attorney, Agent, or Firm*—Baker Botts L.L.P.

(57) ABSTRACT

Methods, apparatuses and systems that dynamically adjust the selection of differentiated network services for selected classes of traffic or network applications in response to changing network conditions or application performance levels.

15 Claims, 13 Drawing Sheets

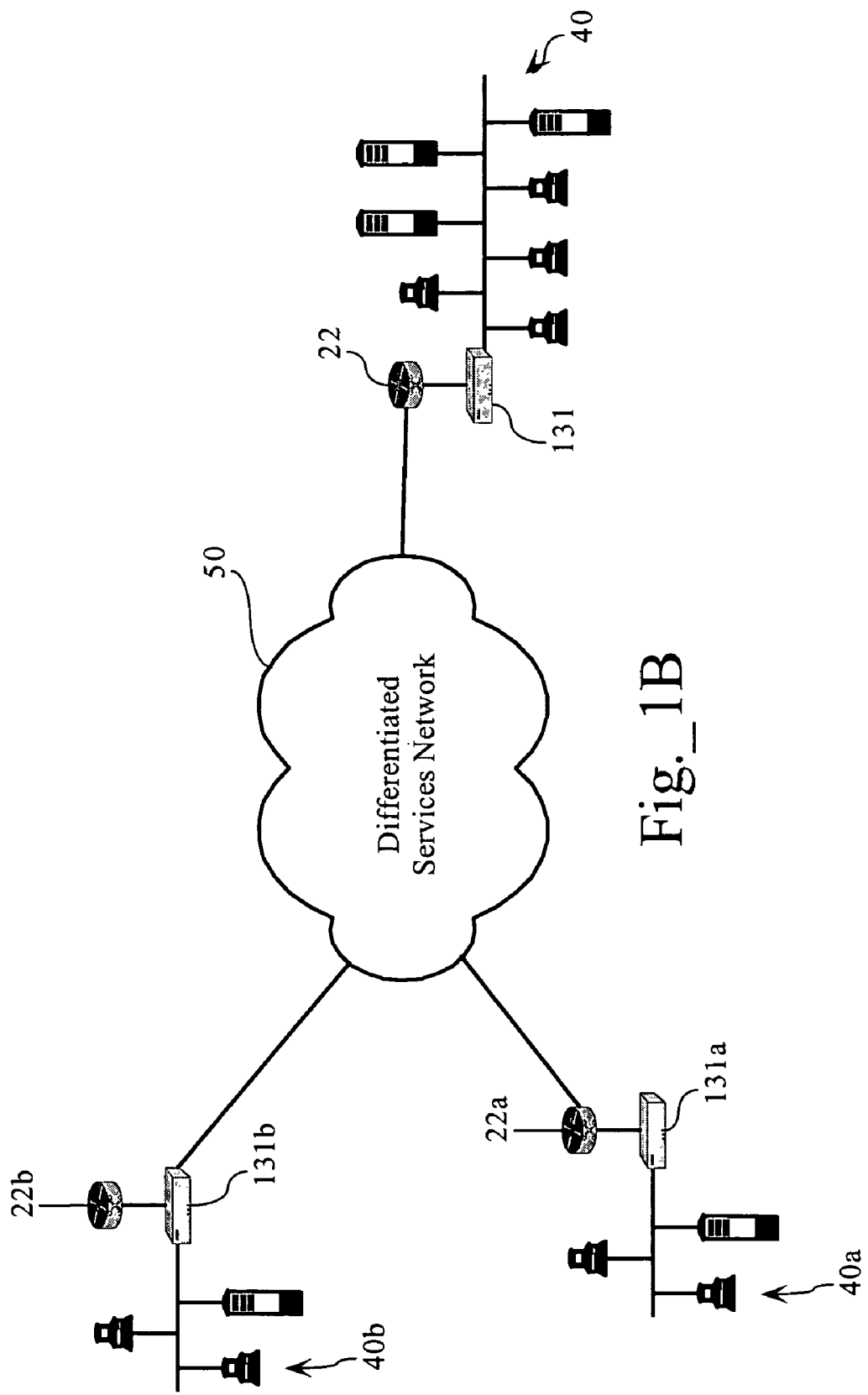
Fig._1B

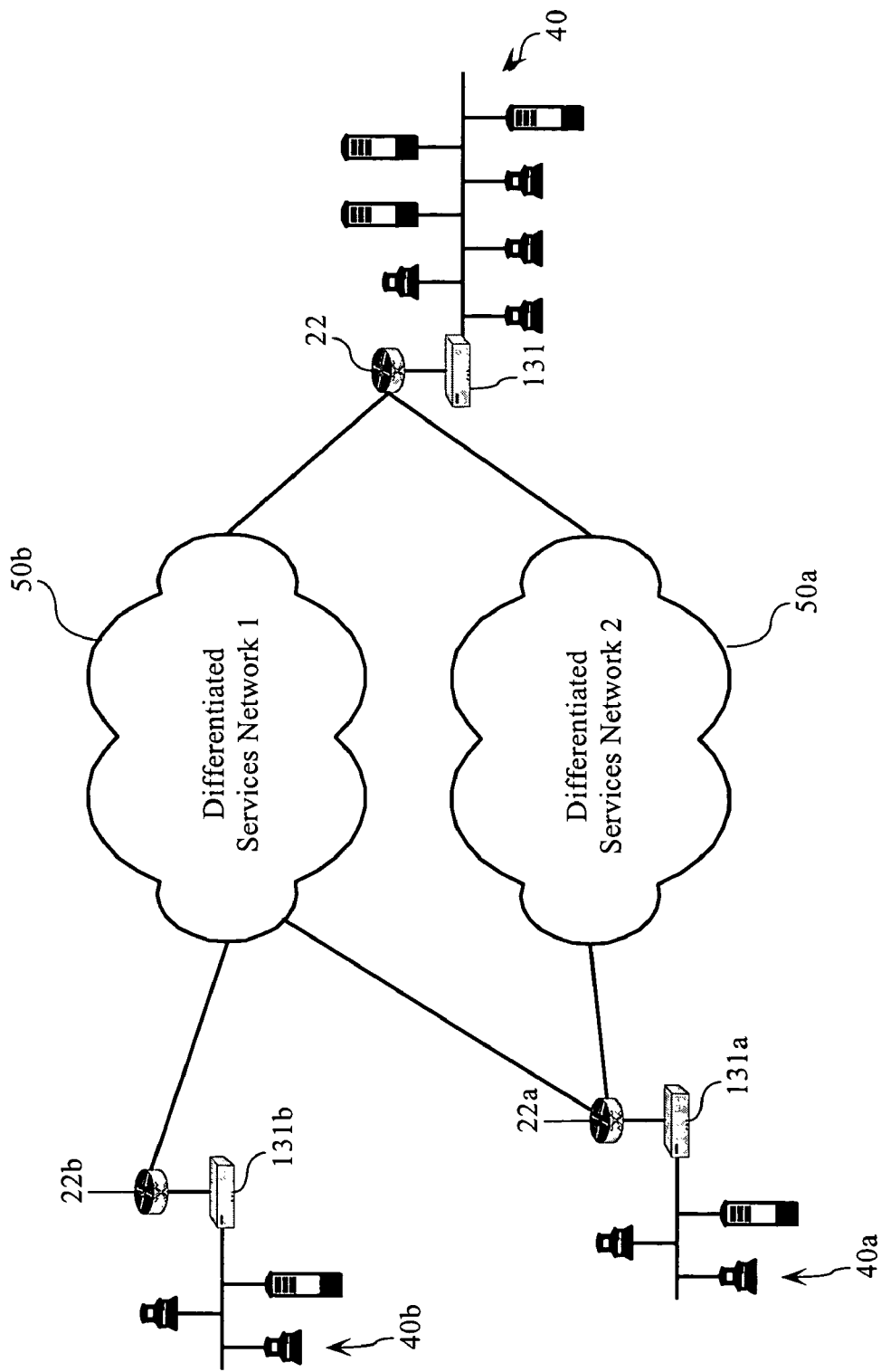
Fig._1C

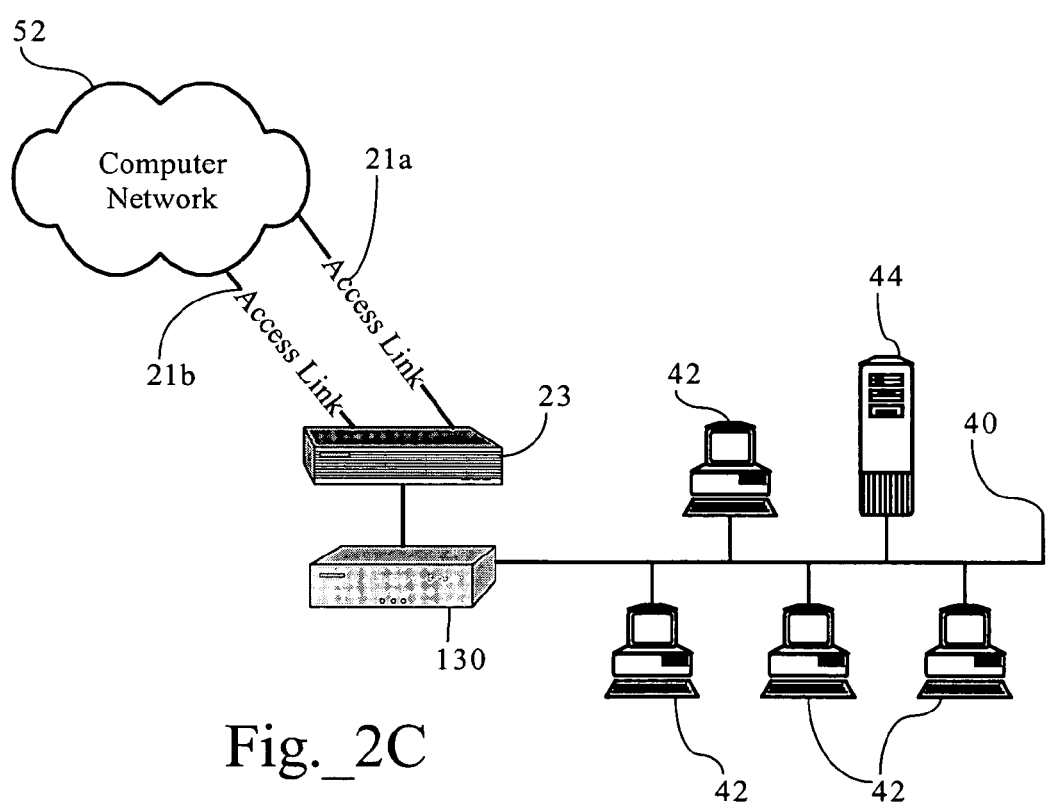
Fig._2C

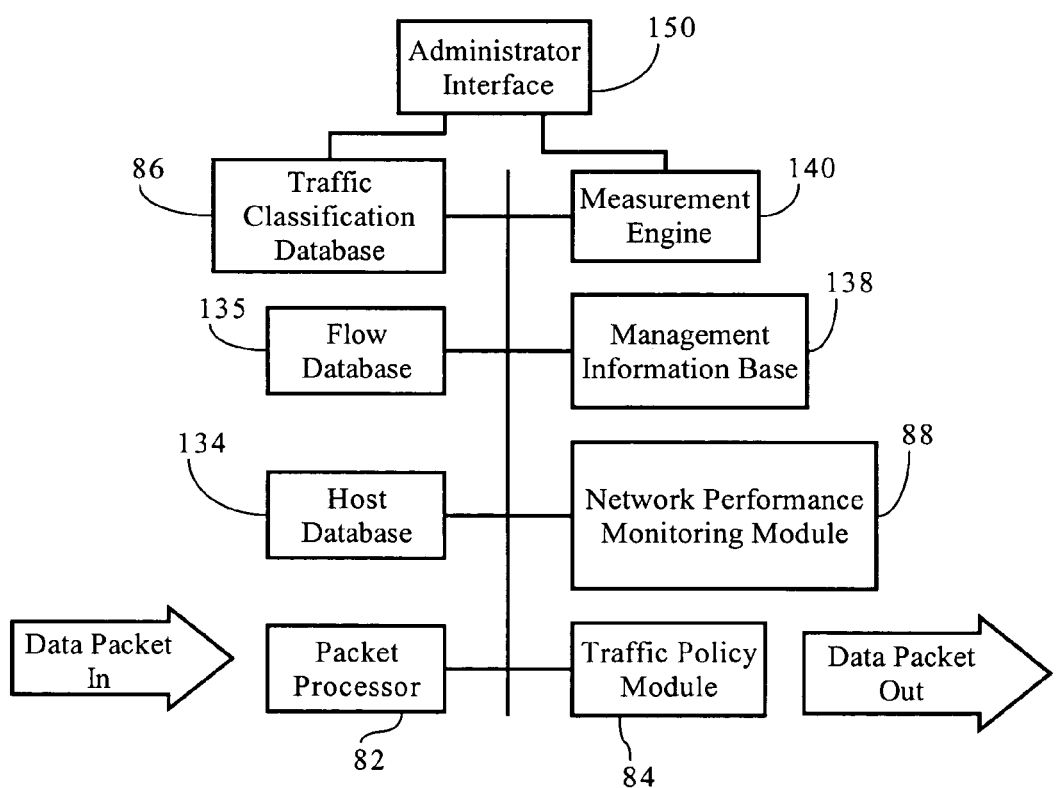
Fig._3

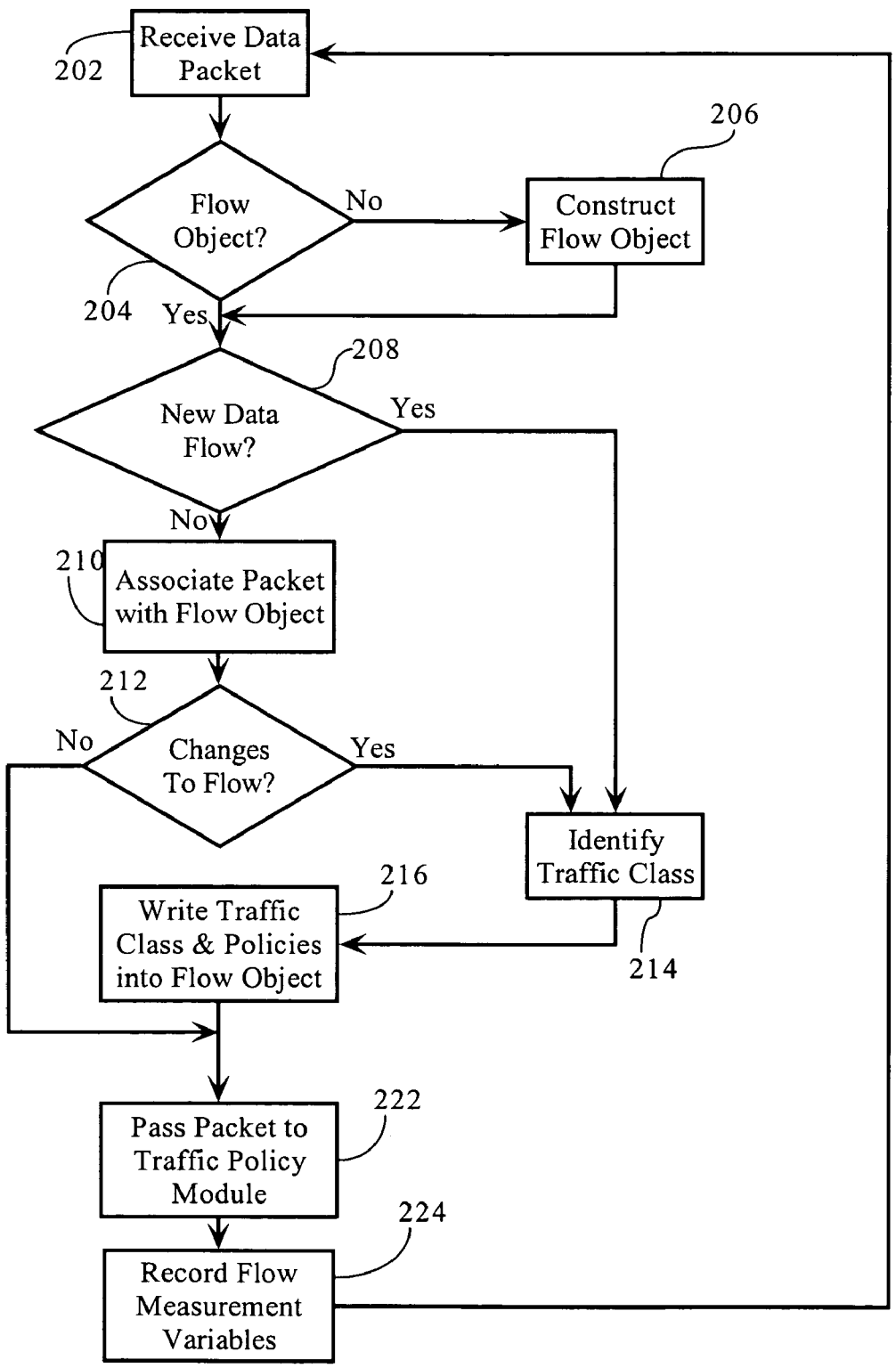
Fig._4

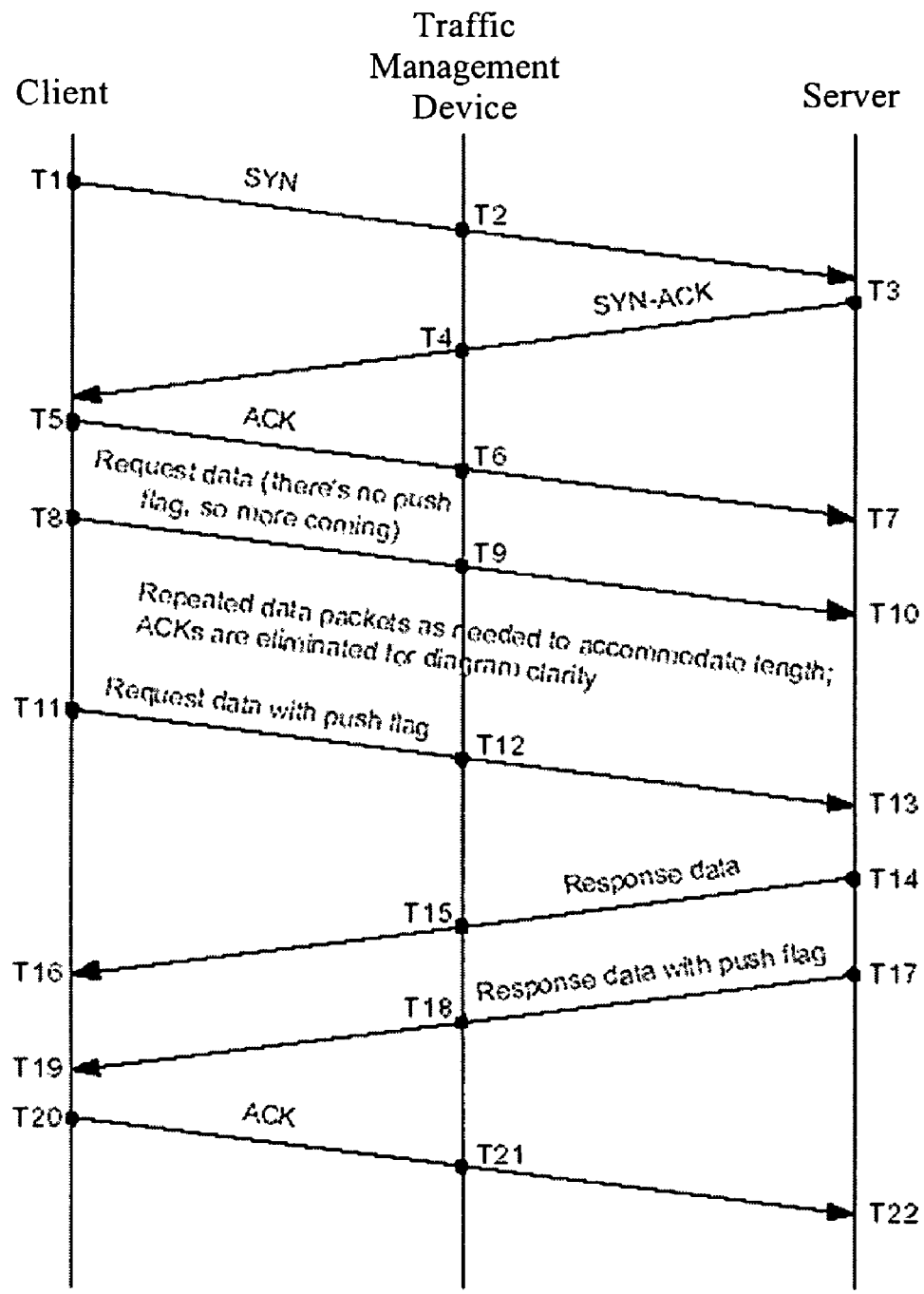
Fig._5

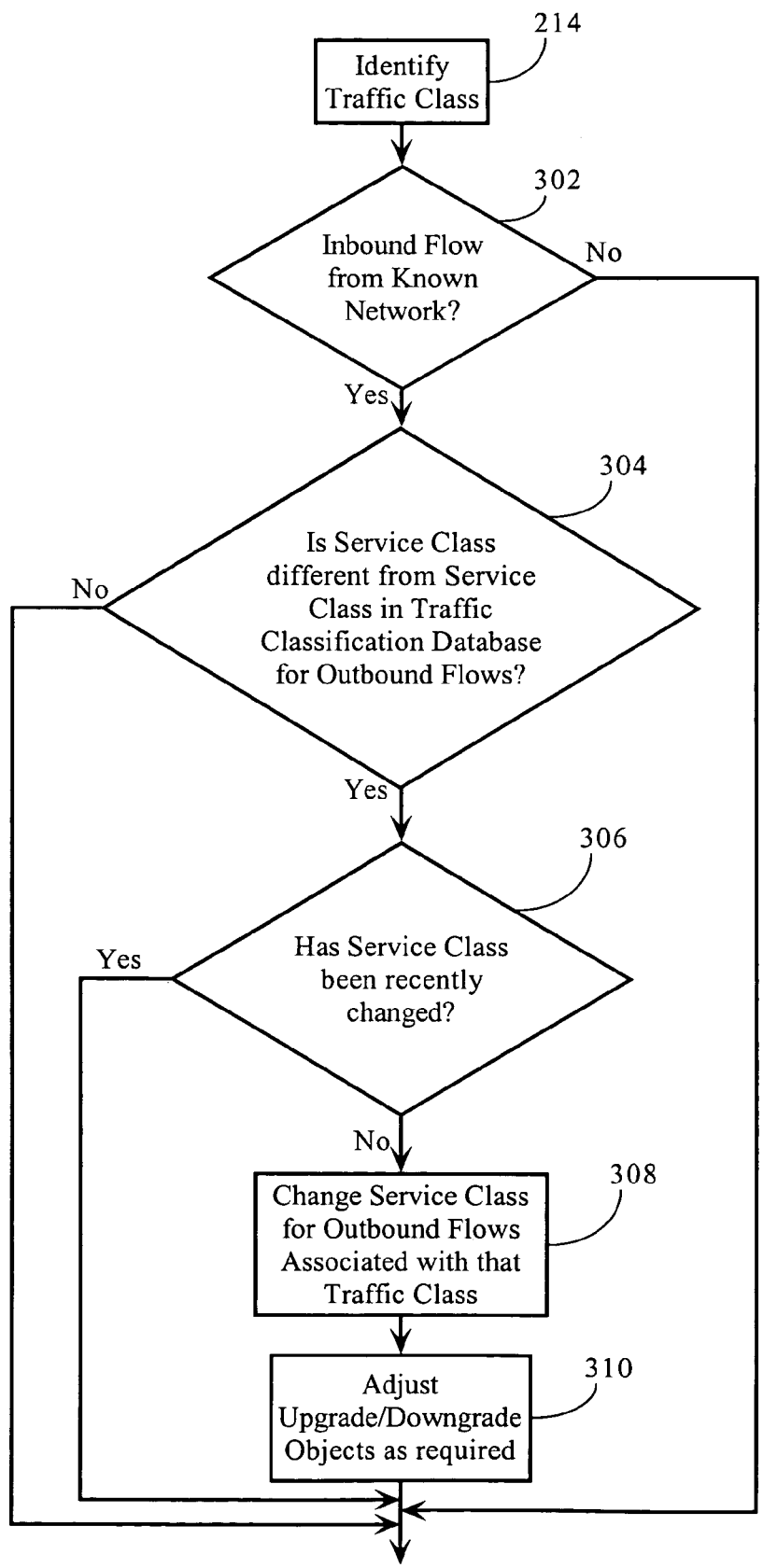
Fig._6

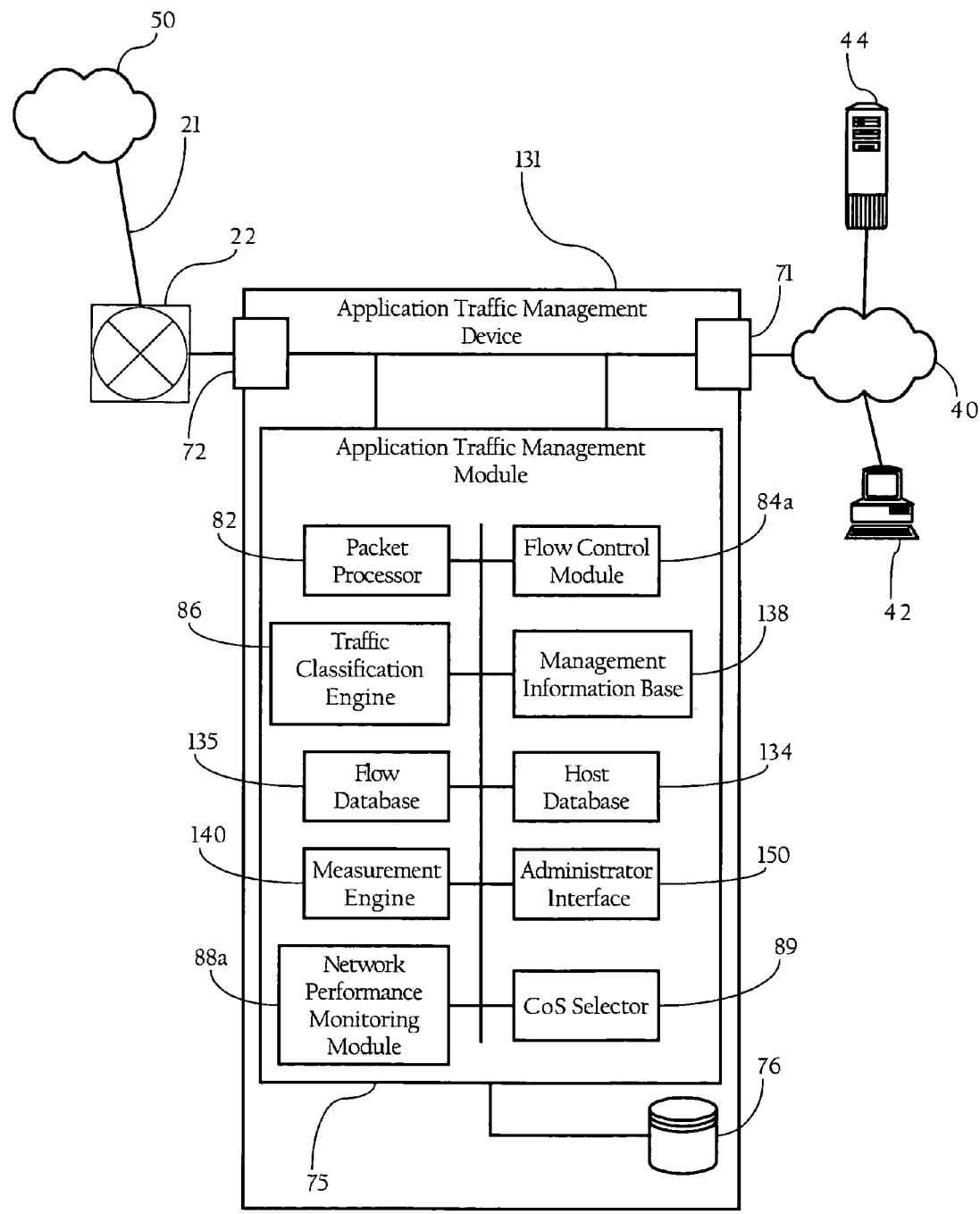
Fig._7

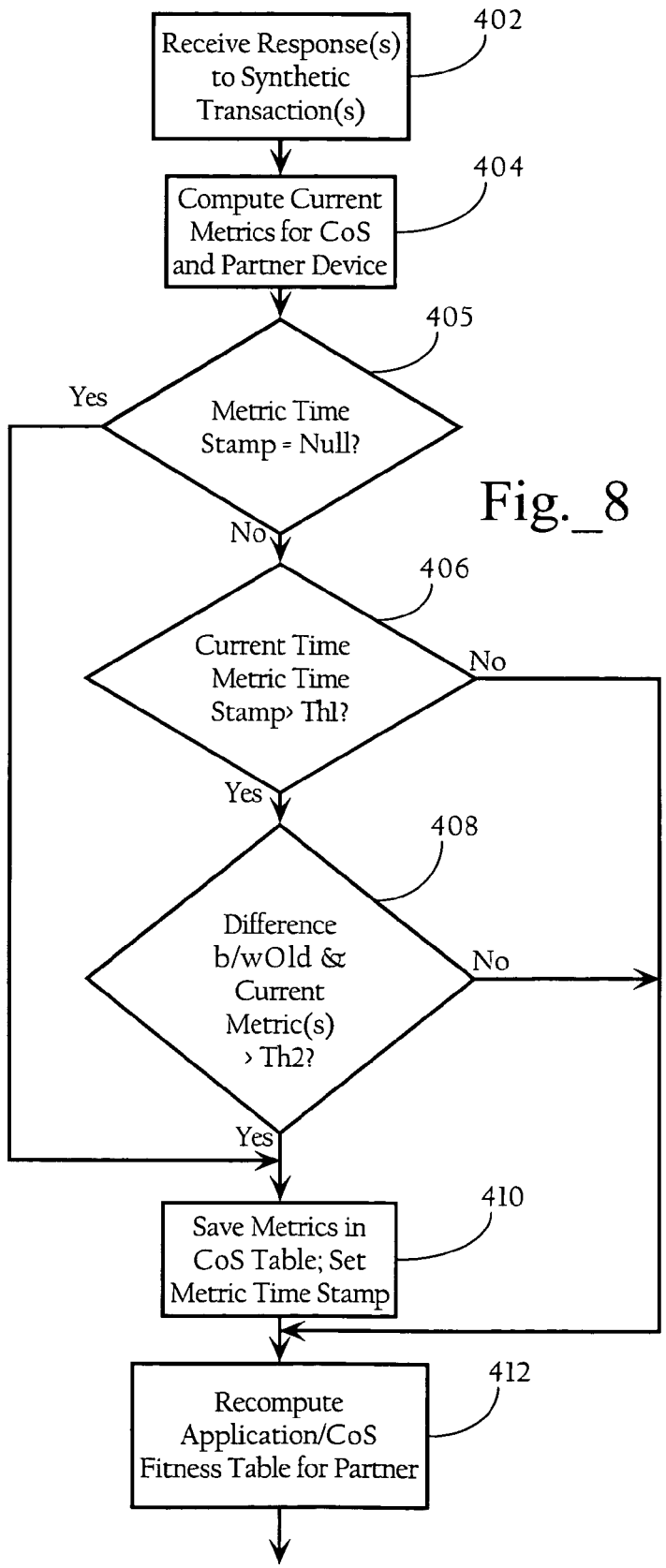
Fig._8

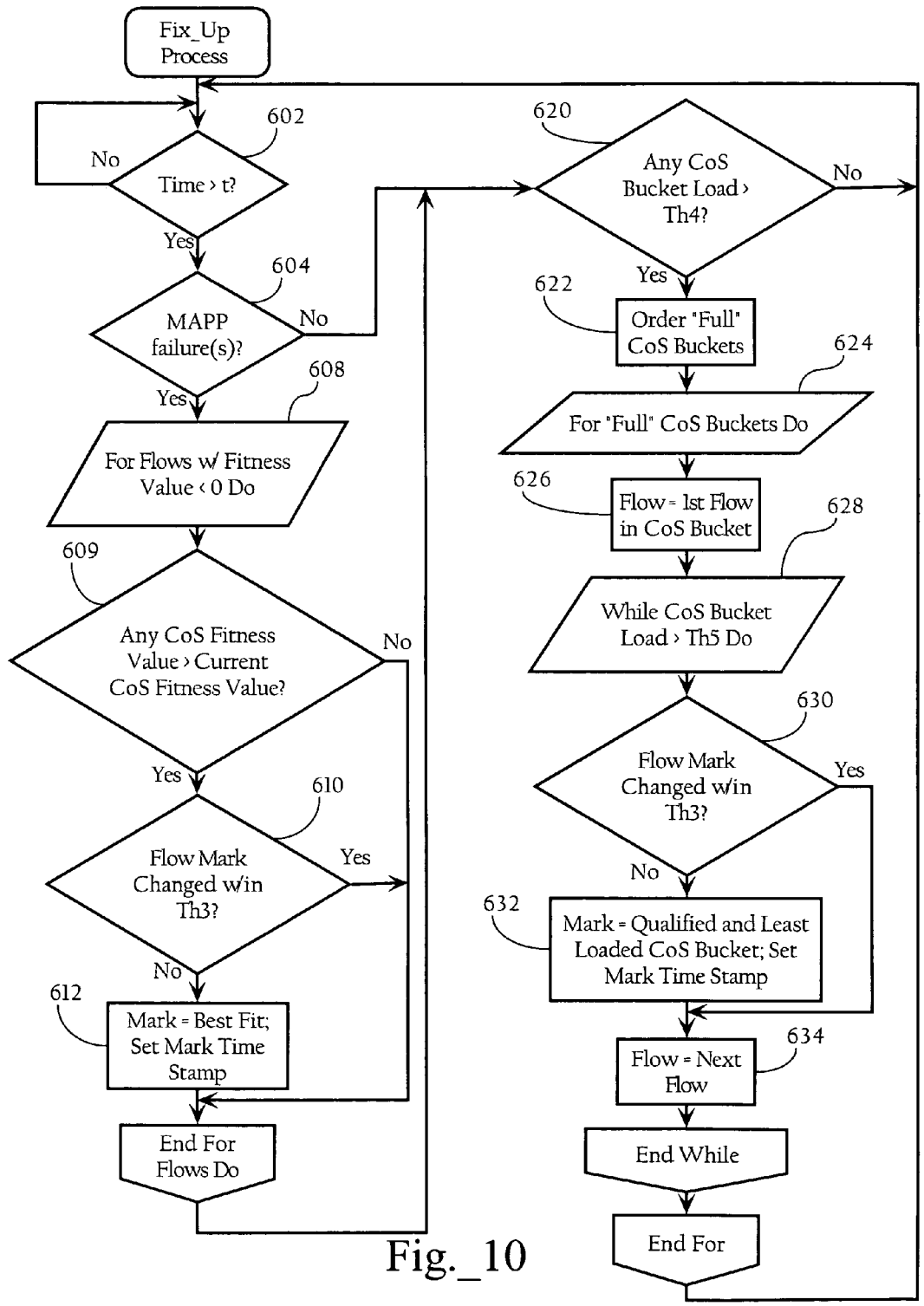
Fig._10

ADAPTIVE, APPLICATION-AWARE SELECTION OF DIFFERNTIATED NETWORK SERVICES

CROSS-REFERENCE TO RELATED APPLICATIONS AND PATENTS

The present application is a continuation-in-part of U.S. application Ser. No. 10/812,198 filed Mar. 29, 2004 now U.S. Pat. No. 7,496,661 and entitled "Adaptive, Application-Aware Selection of Differentiated Network Services." This application also makes reference to the following commonly owned U.S. patent applications and patents, which are incorporated herein by reference in their entirety for all purposes:

U.S. patent application Ser. No. 08/762,828 now U.S. Pat. No. 5,802,106 in the name of Robert L. Packer, entitled "Method for Rapid Data Rate Detection in a Packet Communication Environment Without Data Rate Supervision,"

U.S. patent application Ser. No. 08/970,693 now U.S. Pat. No. 6,018,516, in the name of Robert L. Packer, entitled "Method for Minimizing Unneeded Retransmission of Packets in a Packet Communication Environment Supporting a Plurality of Data Link Rates;"

U.S. patent application Ser. No. 08/742,994 now U.S. Pat. No. 6,038,216, in the name of Robert L. Packer, entitled "Method for Explicit Data Rate Control in a Packet Communication Environment without Data Rate Supervision;"

U.S. patent application Ser. No. 09/977,642 now U.S. Pat. No. 6,046,980, in the name of Robert L. Packer, entitled "System for Managing Flow Bandwidth Utilization at Network, Transport and Application Layers in Store and Forward Network;"

U.S. patent application Ser. No. 09/106,924 now U.S. Pat. No. 6,115,357, in the name of Robert L. Packer and Brett D. Galloway, entitled "Method for Pacing Data Flow in a Packet-based Network;"

U.S. patent application Ser. No. 09/046,776 now U.S. Pat. No. 6,205,120, in the name of Robert L. Packer and Guy Riddle, entitled "Method for Transparently Determining and Setting an Optimal Minimum Required TCP Window Size;"

U.S. patent application Ser. No. 09/479,356 now U.S. Pat. No. 6,285,658, in the name of Robert L. Packer, entitled "System for Managing Flow Bandwidth Utilization at Network, Transport and Application Layers in Store and Forward Network;"

U.S. patent application Ser. No. 09/198,090 now U.S. Pat. No. 6,412,000, in the name of Guy Riddle and Robert L. Packer, entitled "Method for Automatically Classifying Traffic in a Packet Communications Network;"

U.S. patent application Ser. No. 09/198,051, in the name of Guy Riddle, entitled "Method for Automatically Determining a Traffic Policy in a Packet Communications Network;"

U.S. patent application Ser. No. 09/206,772, in the name of Robert L. Packer, Brett D. Galloway and Ted Thi, entitled "Method for Data Rate Control for Heterogeneous or Peer Internetworking;"

U.S. patent application Ser. No. 09/710,442, in the name of Todd Krautkremer and Guy Riddle, entitled "Application Service Level Mediation and Method of Using the Same;"

U.S. patent application Ser. No. 10/015,826, in the name of Guy Riddle, entitled "Dynamic Tunnel Probing in a Communications Network;"

U.S. patent application Ser. No. 10/039,992, in the name of Michael J. Quinn and Mary L. Laier, entitled "Method and Apparatus for Fast Lookup of Related Classification Entities in a Tree-Ordered Classification Hierarchy;"

U.S. patent application Ser. No. 10/099,629 in the name of Brett Galloway, Mark Hill, and Anne Cesa Klein, entitled "Method And System For Controlling Network Traffic Within The Same Connection With Different Packet Tags By Varying The Policies Applied To A Connection;"

U.S. patent application Ser. No. 10/108,085, in the name of Wei-Lung Lai, Jon Eric Okholm, and Michael J. Quinn, entitled "Output Scheduling Data Structure Facilitating Hierarchical Network Resource Allocation Scheme;"

U.S. patent application Ser. No. 10/155,936 now U.S. Pat. No. 6,591,299, in the name of Guy Riddle, Robert L. Packer, and Mark Hill, entitled "Method For Automatically Classifying Traffic With Enhanced Hierarchy In A Packet Communications Network;"

U.S. patent application Ser. No. 10/236,149, in the name of Brett Galloway and George Powers, entitled "Classification Data Structure enabling Multi-Dimensional Network Traffic Classification and Control Schemes;"

U.S. patent application Ser. No. 10/453,345, in the name of Scott Hankins, Michael R. Morford, and Michael J. Quinn, entitled "Flow-Based Packet Capture;" and U.S. patent application Ser. No. 10/611,573, in the name of Roopesh Varier, David Jacobson, and Guy Riddle, entitled "Network Traffic Synchronization Mechanism."

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates to computer networks and, more particularly, to application-aware, adaptive network traffic management schemes that selectively designate data flows for differentiated network services in response to monitored network or application performance attributes.

BACKGROUND OF THE INVENTION

Enterprises have become increasingly dependent on computer network infrastructures to provide services and accomplish mission-critical tasks. Indeed, the performance and efficiency of these network infrastructures have become critical as enterprises increase their reliance on distributed computing environments and wide area computer networks. The widely-used TCP/IP protocol suite, which implements the world-wide data communications network environment called the Internet and is employed in many local area networks, omits any explicit supervisory function over the rate of data transport over the various devices that comprise the network. While there are certain perceived advantages, this characteristic has the consequence of juxtaposing very high-speed packets and very low-speed packets in potential conflict and produces certain inefficiencies. Certain loading conditions degrade performance of networked applications and can even cause instabilities which could lead to overloads that could stop data transfer temporarily. The above-identified U.S. Patents and patent applications provide explanations of certain technical aspects of a packet based telecommunications network environment, such as Internet/Intranet technology based largely on the TCP/IP protocol suite, and describe the deployment of bandwidth management solutions to monitor and manage network environments using such protocols and technologies.

Enterprise network topologies can span a vast array of designs and connection schemes depending on the enterprises resource requirements, desired service levels, costs and the like. Enterprise network design topologies often include redundant LAN and WAN segments in the enterprise's intranet, and multiple paths to extranets and the Internet. Enterprises that cannot afford the expense of private leased-lines to develop their own WANs, often employ frame relay, or other packet switched networks, together with Virtual Private Networking (VPN) technologies to connect private enterprise sites via a service providers public network or the Internet. Some enterprises also use VPN technology to create extranets with customers, suppliers, and vendors.

To create more efficient and cost effective network services, various differentiated service technologies and protocols have been developed. A differentiated service defines some significant characteristics of packet transmission in one direction across a set of one or more paths within a network. These characteristics may be specified in quantitative or statistical terms of throughput, delay, jitter, and/or loss, or may otherwise be specified in terms of some relative priority of access to network resources. Service differentiation is desired to accommodate heterogeneous application requirements and user expectations, and to permit differentiated pricing of network service. Differentiated services can include diffserv (RFC 2475), relative priority marking, service marking, label switching, Integrated Services/RSVP, and static per-hop classification.

For example, Internet Protocol (IP) networks, without modification, essentially provide best-effort datagram service without distinguishing between types of flows. To support and manage the performance of networked applications, a variety of core network technologies have been developed to deliver tailored network services. For example, many networked applications, such as VoIP, or other real-time transport protocol (RTP) flows, require higher quality of service, relative to other applications, such as e-mail and FTP file transfers. This type of network traffic generally includes characteristics of low latency, low jitter, and delay sensitivity; for example, voice over IP (VoIP), or video over IP traffic. Accordingly, a variety of technologies and protocols have been developed to provide differentiated services over IP networks, such as Multi-Protocol Label Switching (MPLS), and diffserv.

FIG. 1 illustrates, for didactic purposes, a simple differentiated services network, such as a MPLS network, consisting of five routing nodes: R1, R2, R3, R4, and R5. Router R5 is connected to a network segment 40 that contains a subnet with specific destination hosts associated with, for example, an enterprise headquarters. Router R1 is operably connected to a network 40a associated with, for example, a branch office. Routers R1 and R5 are referred to as label-edge routers (LERs), while routers R2, R3, and R4 are label-switching routers (LSRs). LERs receive incoming network traffic (e.g., IP, Ethernet, ATM, frame relay, etc.), and route this network traffic into special-purpose label-switched paths (LSPs) created to span the network or some part of the network. FIG. 1 illustrates two such LSPs: LSP1 and LSP2. For didactic purposes, assume that LSP1 has been created to carry real-time traffic through the network. LSP2 has been created to carry non-real-time traffic, such as email. Often, the network service provider charges its enterprise customers a higher rate for the use of LSP1.

The label switched paths in the MPLS network can be configured or provisioned using signaling protocols such as Resource Reservation Protocol with traffic engineering extensions (RSVP-TE) and Label Distribution Protocol (LDP). For example, LSP1 can be configured as an MPLS tunnel. An MPLS tunnel is basically a label switched path with some type of associated set of constraints, such as a specified path, resource reservation across the path, and other QoS-related capabilities (e.g., DiffServ/IntServ service classes). As FIG. 1 illustrates, the specified path of LSP1 from the branch office to headquarters is routers R1-R2-R3-R5. Resource reservation along the path generally connotes quality of service (QoS). Resource reservation often includes minimum guaranteed or required bandwidth, as well as other traffic characteristics, such as maximum burst size, mean burst size, and so on. These characteristics are specified or used when signaling the nodes in a label switched path as part of the underlying router resource reservations. For example, resource reservation generally includes reserving port buffer space, hardware queues, fabric capacity, etc.

Additional QoS requirements on a given label switched path can also be specified or configured using DiffServ and IntServ classes. These classes provide a greater degree of control over how the incoming traffic is managed as it passes across the MPLS network. In the didactic example of FIG. 1, LSP2 (R1, R4, R5) can created using the LDP protocol. This label switched path has no reserved bandwidth and its path is created by R1, in one direction, in conjunction with its internal routing protocols.

The resulting MPLS core network is then packet-based using MPLS and some specified QoS mechanism such as DiffServ, IntServ, and so on. According to the MPLS protocol, a short fixed-length label is generated that acts as a shorthand representation of an IP packet's header. Subsequent routing decisions (made by Label Switched routers) are made based on the MPLS label and not the original IP address in the IP header. This technology allows core network routers to operate at higher speeds without needing to examine each packet in detail, and allows more complex services to be developed, allowing discrimination on a QoS basis. Other parameters can also be used for forwarding: source IP address, source/destination port, IP type of service field (now called the Differentiated Services field, as defined in RFC 3260).

As discussed above, MPLS networks support a variety of QoS mechanisms including IP Precedence, Committed Access Rate (CAR), Random Early Detection (RED), Weighted RED, Weighted Fair Queuing (WFQ), Class-based WFQ, and Priority Queuing. Proprietary and non-standard QoS mechanisms can also be supported. MPLS may also be integrated with Differentiated Services protocols, such as diffserv, to provide for a plurality of service classes. For example, a service provider may deploy an MPLS network that has the following QoS classes: 1) High-priority, low-latency "Premium" class—(Gold Service); 2) Guaranteed-delivery "Mission-Critical" class—(Silver Service); and 3) Low-priority "Best-Effort" class—(Bronze Service).

Many MPLS networks are managed by managed network service providers that bill or charge enterprises based on a flat-rate, a usage-based model, or a combination of the two. A variety of tiered rate models can be used as well. Usage can be computed based on the number of IP packets forwarded (via MPLS) across an LSP, average bit rate, and the like. For example, a typical enterprise may pay for the use of LSP2 based on a flat-rate model, while paying for data transfer across LSP1 based on usage. Not surprisingly, different combinations of label switched paths and/or QoS classes may each have different rates, obviously, with higher classes of service being more expensive. For example, Network Service Providers can use a number of pricing models, including:

1) Fixed Charge per Byte: In one billing model, network service providers charge a fixed amount per byte of data that traverses the Service Provider's network. The amount per byte depends upon criteria including, but not limited to, the Class of Service of the packet that the byte of data contains and the time at which the byte of data is sent.

2) Fixed CoS Allocations: In another billing model, a network service provider collects a monthly from a customer for network services. According to an SLA agreement, the total bandwidth associated with the service is allocated among different classes or levels of service. For example, a Service Provider might make an agreement with a customer that allocates 30 percent of available bandwidth to a "Gold" class of service, 30 percent to a "Silver" class of service, and the remaining 40 percent to a "Bronze" class of service. In addition, the definition of each class of service is precisely described in terms of network performance.

In addition to MPLS and other differentiated service networks, many enterprises often have redundant connections between any two given sites, or even redundant physical connections between a given site and the Internet. Often these connections or links differ in capabilities and cost. Routers, typically using Border Gateway Protocols (BGP) to select a path to a given destination host do not account for cost, performance or the application associated with the data flow. A variety of network vendors have tried to optimize performance and/or reduce costs by controlling and modifying the routing policies on edge routers that would otherwise result with BGP. These route optimization approaches, however, generally involve complex and intensive technical requirements difficult for most network managers to use and configure. In addition, such network routing policy appliances, however, do not perform route optimization based on the network application associated with the data flow, rendering it difficult, if not impossible, to control data flows on a per-application basis.

In attempting to control the cost of network bandwidth, enterprises typically balance cost against performance. The network configuration and provisioning, however, that result from this cost-versus-performance analysis is generally performed at one instance in time, and does not adapt to changing network conditions. For example, it may be advantageous to an enterprise to use a least cost path to a given destination host until the performance of one or more network applications of interest, or other classes of traffic, suffers. At that point, a different, higher-cost path can be selected for the selected application traffic. Still further, enterprises may desire to tolerate low performance for low priority applications, while selectively increasing service levels for high priority applications. Known prior art mechanisms, however, are not application aware. Furthermore, known mechanisms do not dynamically adjust to changing network conditions or network application performance in this manner.

In light of the foregoing, a need in the art exists for methods, apparatuses and systems that dynamically adjust the selection of differentiated network services for selected classes of traffic in response to changing network conditions or application performance levels. Embodiments of the present invention substantially fulfill this need.

SUMMARY OF THE INVENTION

The present invention provides methods, apparatuses and systems that dynamically adjust the selection of differentiated network services for selected classes of traffic or network applications in response to changing network conditions or application performance levels. In one implementation, the present invention allows for a differentiated network services scheme that adapts to existing network conditions and, in one implementation, selects higher, generally more expensive classes of differentiated network service for certain data flows when the performance of selected applications degrades below a threshold level. The present invention, in one implementation, allows for bandwidth cost savings without sacrificing application performance.

In another implementation, the present invention allows network administrators to configure minimum acceptable performance parameters (MAPPs) for one or more selected network applications. A network performance monitoring module actively tests Class of Service metrics (e.g., latency, jitter, packet loss, etc.), and computes the fitness of each class of service based on the MAPPs and the observed performance of each class of service. As CoS metrics change, these fitness values change as well. A CoS selector, in one implementation, is operative to selectively mark packets with the appropriate CoS markings based on the fitness values, if any, that apply to the packets. As discussed in more detail below, the CoS selector, in some implementations, also includes functionality directed to handling situations where a given Class of Service is oversubscribed. Still further, one implementation of the present invention can employ functionality directed to monitoring the performance of a network relative to an applicable service level agreement.

DESCRIPTION OF THE DRAWINGS

FIG. 2C is a schematic diagram illustrating a first computer network connected to a second computer network by a plurality of access links.

FIG. 3 is a functional block diagram setting forth the functionality in a traffic management device according to an embodiment of the present invention.

FIG. 4 is a flow chart diagram providing a method, according to an embodiment of the present invention, directed to the processing of packets.

FIG. 5 is a TCP diagram illustrating the measurement of response times associated with TCP transactions.

FIG. 6 is a flow chart diagram showing a method, according to one implementation of the present invention, directed to coordinating the operation of two traffic management devices.

FIG. 7 is a functional block diagram illustrating a traffic management device according to another implementation of the present invention.

FIG. 8 is a flow chart diagram setting forth a method, according to one implementation of the invention, directed to maintaining performance metrics for different classes of service.

FIG. 10 is a flow chart diagram illustrating a method, according to one implementation of the invention, directed to re-assigning data flows to classes of network service.

DESCRIPTION OF PREFERRED EMBODIMENT(S)

Figure 1A:
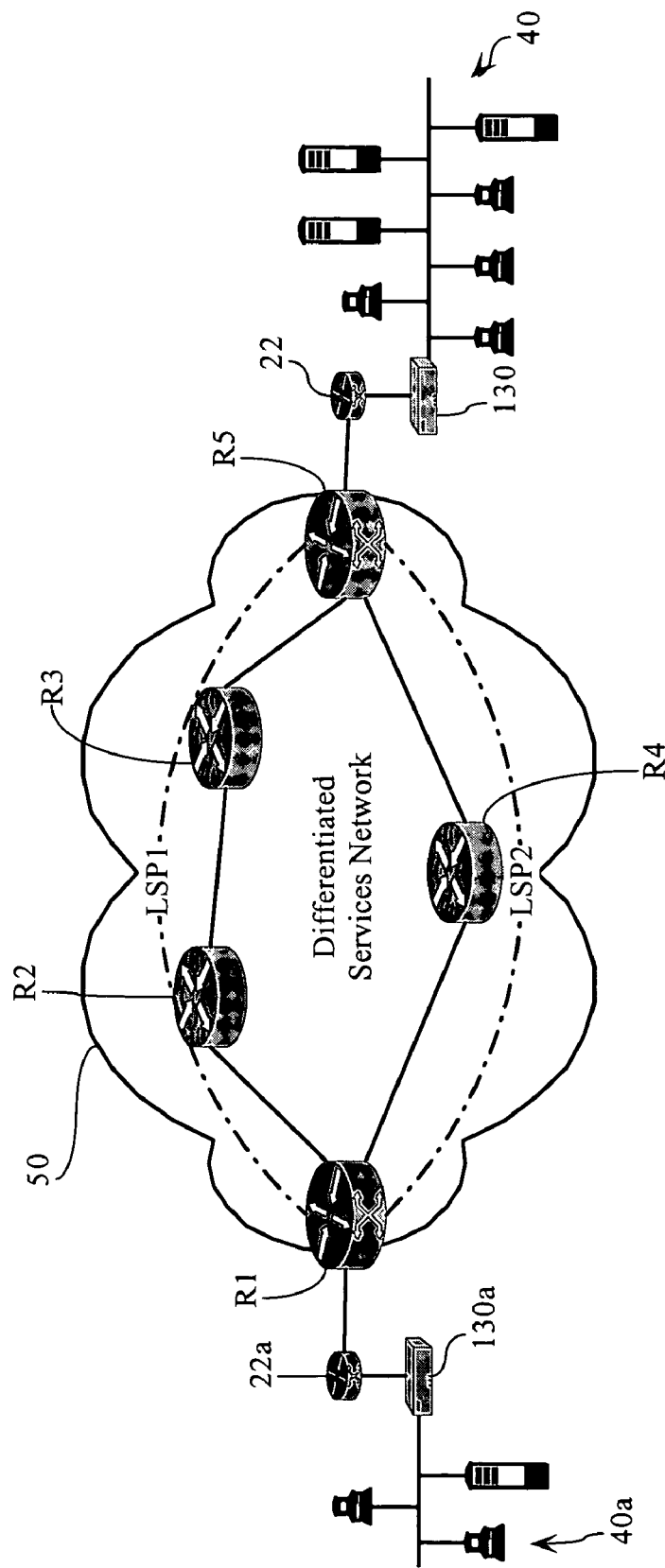
FIG. 1 is a schematic diagram of a computer network environment including a differentiated services network, such as a MPLS core network, interconnecting a first network and a second network.
Figure 2A:
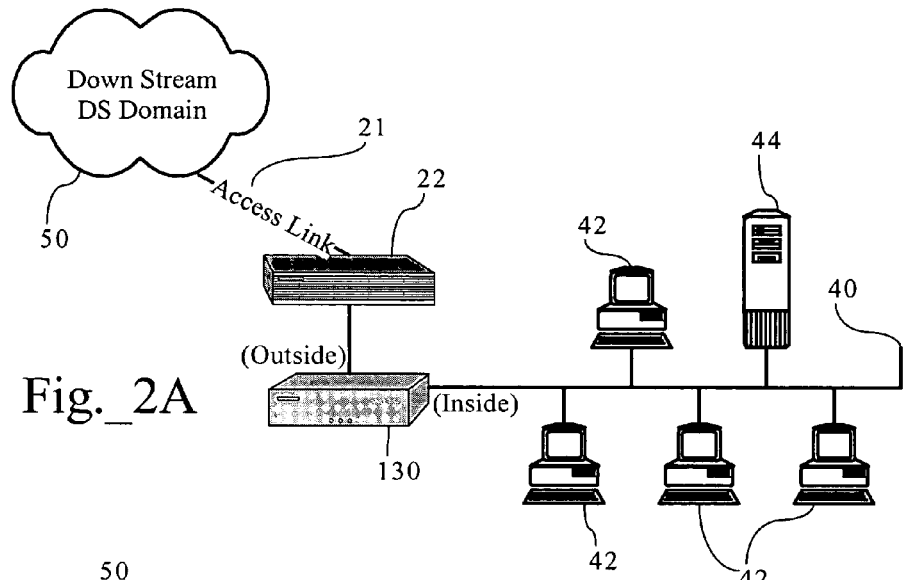
FIG. 2A is a schematic diagram illustrating a computer network operably connected to a downstream differentiated service (DS) capable domain.

FIGS. 1 and 2A illustrate a general network environment in which an embodiment of the present invention operates. As discussed above, FIG. 1 illustrates, for didactic purposes, a differentiated services network 50, such as an MPLS network, interconnecting a first enterprise network 40, such as a central operating or headquarters facility, and a second enterprise network 40a, such as a branch office facility. As FIG. 2A shows, network 40 interconnects several TCP/IP end systems, including client devices 42 and server device 44, and provides access to resources operably connected to computer network 50 via router 22 and access link 21. Access link 21 is a physical and/or logical connection between two networks, such as computer network 50 and network 40. The computer network environment, including network 40 computer network 50 is a packet-based communications environment, employing TCP/IP protocols, and/or other suitable protocols, and has a plurality of interconnected digital packet transmission stations or routing nodes. Network 40 can be a local area network, a wide area network, or any other suitable network.

Differentiated services network 50, in one implementation, is a packet-based network comprising a plurality of routing nodes that support a plurality of differentiated service classes. A service class, in one implementation, defines one or more characteristics of packet transmission in one direction across a set of one or more paths within differentiated services network. These characteristics may be specified in quantitative or statistical terms of throughput, delay, jitter, and/or loss, or may otherwise be specified in terms of some relative priority of access to network resources. These characteristics may also be defined in relation to routes or paths within a network. In one implementation, differentiated services network 50 operates by applying different per-hop behaviors to aggregates of network traffic that have been marked or tagged in some fashion. A per-hop behavior (PHB) is a description of the externally observable forwarding behavior of a routing node applied to a particular service class or group of service classes. PHBs may be specified in terms of their resource (e.g., buffer, bandwidth) priority relative to other PHBs, or in terms of their relative observable traffic characteristics (e.g., delay, loss). Per-hop behaviors, in one implementation, are defined to provide a means of allocating buffer and bandwidth resources among competing traffic streams at each routing node in the differentiated services network 50. Differentiated services network 50 can employ one to a plurality of differentiated network services technologies, such as diffsery (see, e.g., RFC 2475, Blake et al. "An Architecture for Differentiated Services"), relative priority marking, service marking, label switching, Integrated Services/RSVP, and static per-hop classification. Examples of suitable label switching (or virtual circuit) technologies include Frame Relay, ATM, and MPLS [FRELAY, ATM]. Accordingly, traffic management device 130 can determine which differentiated service class applies to outbound data flows by marking outbound packets with appropriate codes, labels, and/or tags.

As discussed more fully below, traffic management device 130 is operative to monitor the performance of one or more network applications and mark outbound data flows associated with the network applications for differentiated services across differentiated services network 50 depending on the performance attributes of the network applications. One implementation of the present invention can be used to reduce bandwidth cost, while maintaining acceptable application performance. For example, each service class typically has a corresponding price level. Accordingly, traffic management device 130, in one implementation, can be configured to mark or tag all data flows for the least cost service class. When the performance of a given network application (or any defined class of traffic) drops below a threshold level, traffic management device 130 can begin to mark or tag the data flows associated with that application or traffic class for a higher, more expensive class of service. In one implementation, the network application is then downgraded to the default service class after a period of time, or when the performance of the service class is once again within acceptable levels.

In another implementation, traffic management device 130 can be configured to optimize the performance of one or more networked applications. For example, traffic management device 130, or another network device in the communications path, can be configured to mark or tag data flows according to a default differentiated service scheme, where high priority data flows receive higher classes of service. Simply designating higher priority traffic for higher service classes, however, may not result in higher performance. The diffsery architecture offers limited service guarantees in the form of service classes. Data flows assigned to higher service classes usually experience lighter network load than data flows assigned to a lower class. However, there are no guarantees for the service quality. Thus, at certain times load for a given service class may be so high that the performance of an application using that service class can be less than satisfactory. Accordingly, traffic management device 130 can be configured to select an alternate service class for a given network application, if performance under the existing service class falls below a given threshold.

Figure 2B:
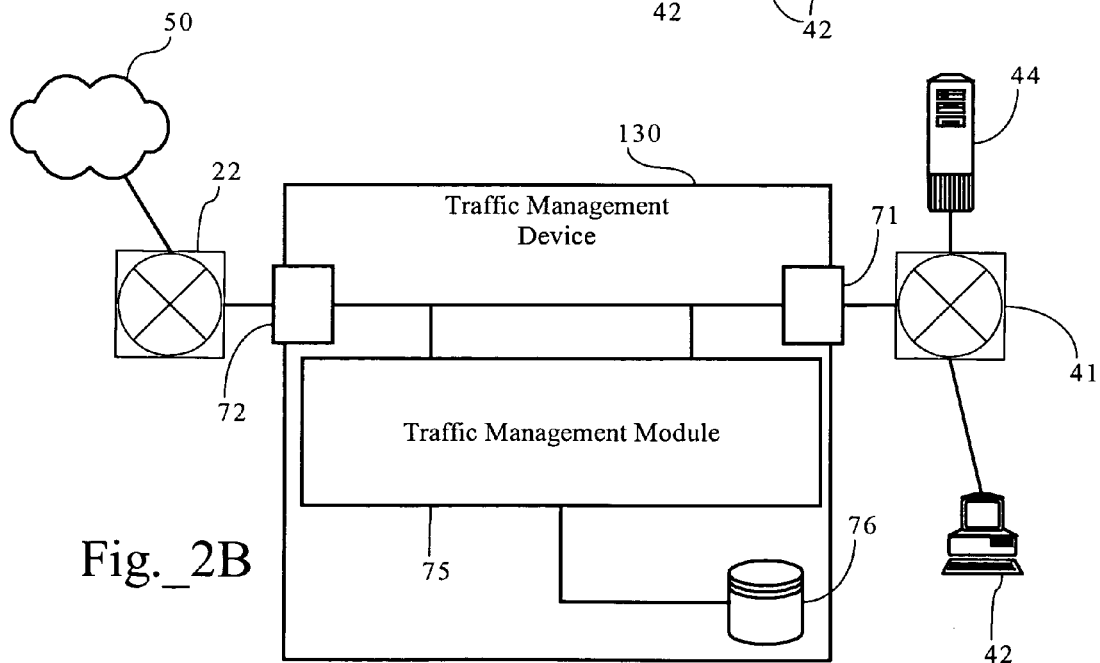
FIG. 2B is a functional block diagram illustrating a traffic management device according to an implementation of the present invention.

As the Figures illustrate, a variety of deployment configurations are possible. FIG. 2B shows a first network device 41 (such as a hub, switch, router, and/or a variety of combinations of such devices implementing a LAN or WAN) interconnecting two end-systems (here, client computer 42 and server 44). As FIGS. 2A and 2B illustrate, traffic management device 130 is provided between router 22 and network 40. In implementations, where differentiated services network 50 employs tags, such as MPLS tags, to aggregate network traffic into service classes, router 22 must be configured to recognize these tags. Alternatively, in other implementations, traffic management device 130 may be disposed in the communication path between access link 21 and router 22. In such a deployment, traffic management device 130 may add appropriate tags to outbound packets after they are emitted from the egress interface of router 22.

Other configurations are possible. For example, FIG. 2C illustrates another computer network environment in which implementations of the present invention can operate. As FIG. 2C shows, first and second access links 21a, 21b interconnect network 40 and network 52. Router 23, in one implementation, is operative to select either access link 21a or 21b depending on the state of the markings or tags associated with each packet. Network 52 may be any suitable network, such as an Internet Service Provider network, which may or may not be a differentiated services capable domain. In addition, since the marking or tagging of data flows only affects outbound data flows, in certain implementations, the deployment of traffic management devices 130, 130a (as FIG. 1 illustrates) at strategic locations in the communications path between networks 40, 40a can operate on data flows in both directions between respective hosts associated with those networks. As discussed more fully below, one implementation of the present invention features functionality to coordinate the operation of traffic management devices 130, 130a.

The functionality of traffic management device 130 can be integrated into a variety of network devices that are typically located at strategic points in computer networks, such as firewalls, routers, gateways, proxies, packet capture devices and bandwidth management devices. As FIGS. 1 and 2A show, the traffic management device 130, in one embodiment, is disposed on the communication path between network 40 and router 22. In other embodiments, multiple traffic management devices can be disposed at strategic points in a given network infrastructure to achieve various objectives. For example, the traffic monitoring functionality described herein may be deployed in multiple network devices and used in redundant network topologies by integrating the network traffic synchronization functionality described in U.S. application Ser. No. 10/611,573, incorporated by reference above.

A. Application-Aware, Adaptive Selection of Differentiated Services

As discussed above, traffic management device 130 is operative to monitor the performance of one or more network applications in relation to one or more attributes of the data flows traversing access link 21, and selectively mark or tag the data flows for a given service class depending on the monitored performance. As FIG. 2B illustrates, traffic management device 130, in one implementation, comprises traffic management module 75, and first and second network interfaces 71, 72, which operably connect traffic management device 130 to the communications path between first network device 41 and second network device 22. Traffic management module 75 generally refers to the functionality implemented by traffic management device 130. In one embodiment, traffic monitoring module 75 is a combination of hardware and software, such as a central processing unit, memory, a system bus, an operating system and one or more software modules implementing the functionality described herein.

In one embodiment, first and second network interfaces 71, 72 are the hardware communications interfaces that receive and transmit packets over the computer network environment. In one implementation, first and second network interfaces 71, 72 reside on separate network interface cards operably connected to the system bus of application traffic management device 130. In another implementation, first and second network interfaces reside on the same network interface card. In addition, the first and second network interfaces 71, 72 can be wired network interfaces, such as Ethernet (IEEE 802.3) interfaces, and/or wireless network interfaces, such as IEEE 802.11, BlueTooth, satellite-based interfaces, and the like. As FIG. 2 illustrates, application traffic management device 130, in one embodiment, includes persistent memory 76, such as a hard disk drive or other suitable memory device, such writable CD, DVD, or tape drives. In other implementations, application traffic management device 130 can include additional network interfaces, beyond network interfaces 71 and 72, to support additional access links or other functionality. Furthermore, U.S. application Ser. No. 10/843,185 provides a description of the operation of various modules, such as network interface drivers, and data structures for receiving into memory and processing packets encountered at network interfaces 71, 72.

As FIG. 3 illustrates, traffic management module 75, in one implementation, includes a packet processor 82, a traffic classification database 86, a traffic policy module 84, and a traffic monitoring module 88. In one embodiment, the packet processor 82 is operative to process data packets, such as storing packets in a buffer structure, detecting new data flows, and parsing the data packets for various attributes (such as source and destination addresses, and the like) and maintaining one or more measurement variables or statistics in connection with the flows. The traffic classification database 86, as discussed more fully below, is operative to classify data flows based on one or more attributes associated with the data flows. Traffic classification database 86, in one implementation, stores traffic classes associated with data flows encountered during operation of traffic management device 130, as well as manually created traffic classes configured by a network administrator, in a hierarchical traffic class structure. In one embodiment, traffic classification database 86 stores traffic classes, in association with pointers to traffic management policies or pointers to data structures defining such traffic management policies. Traffic policy module 84 is operative to apply one or more traffic management policies to data flows traversing traffic management device 130. In one implementation, traffic policy module 84 is operative to mark or tag the packets (or alter existing markings or tags) associated with a given data flow for a given service class supported by differentiated service network 50. Traffic monitoring module 88, as described more fully below, is operative to monitor the performance of network 50 relative to one or more traffic classes. For example, traffic monitoring module 88 can be configured to monitor the performance of a given network application, such as Citrix®, Oracle®, and the like in relation to one or more performance attributes. As discussed in more detail below, the performance of a given network application or the overall network, as computed by traffic monitoring module 88, can be used to determine how data flows associated with the network application are marked or tagged.

In one implementation, traffic management module 75 further comprises measurement engine 140, management information base (MIB) 138, and administrator interface 150. Management information base 138 is a database of standard and extended network objects related to the operation of traffic management device 130. Measurement engine 140 maintains measurement data relating to operation of traffic management device 130 to allow for monitoring of bandwidth utilization and network performance across access link 21 with respect to a plurality of bandwidth utilization and other network statistics on an aggregate and/or per-traffic-class level.

Administrator interface 150 facilitates the configuration of traffic management device 130 to adjust or change operational and configuration parameters associated with the device. For example, administrator interface 150 allows administrators to select identified traffic classes and associate them with traffic management policies. For example, administrator interface 150 allows a network administrator to define one or more service classes supported by differentiated services network 50 and supply the labels, codes, tags or other information required to designate packets to receive a given class of network service. Administrator interface 150 also allows a network administrator to select a given traffic class corresponding to a network application and specify a traffic management policy that causes traffic management device 130 to mark data flows associated with that traffic class for a higher service class when the performance of that application degrades below a configured threshold. As discussed in more detail below, administrator interface 150, in other implementations, allows users to configure network service performance requirements for one or more network applications to allow the network applications to be mapped to classes of service based on observed performance of the differentiated services network. Administrator interface 150 also displays various views associated with a hierarchical traffic classification scheme and allows administrators to configure or revise the hierarchical traffic classification scheme. Administrator interface 150 can be a command line interface or a graphical user interface accessible, for example, through a conventional browser on client device 42.

A.1. Packet Processing

In one embodiment, when packet processor 82 encounters a new data flow it stores the source and destination IP addresses contained in the packet headers in host database 134. Packet processor 82 further constructs a control block (flow) object including attributes characterizing a specific flow between two end systems. In one embodiment, packet processor 82 writes data flow attributes having variably-sized strings (e.g., URLs, host names, etc.) to a dynamic memory pool. The flow specification object attributes contain attribute identifiers having fixed sizes (e.g., IP addresses, port numbers, service IDs, protocol IDs, etc.), as well as the pointers to the corresponding attributes stored in the dynamic memory pool. Other flow attributes may include application specific attributes gleaned from layers above the TCP layer, such as codec identifiers for Voice over IP calls, Citrix Application Session identifiers, and the like. Packet processor 82, in one embodiment, reserves memory space in the dynamic memory pool for storing such variably-sized attribute information as flows traverse traffic management device 130. Packet processor 82 also stores received packets in a buffer structure for processing. In one embodiment, the packets are stored in the buffer structure with a wrapper including various information fields, such as the time the packet was received, the packet flow direction (inbound or outbound), and a pointer to the control block object corresponding to the flow of which the packet is a part.

In one embodiment, a control block object contains a flow specification object including such attributes as pointers to the "inside" and "outside" IP addresses in host database 134, as well as other flow specification parameters, such as inside and outside port numbers, service type (see below), protocol type and other parameters characterizing the data flow. In one embodiment, such parameters can include information gleaned from examination of data within layers 2 through 7 of the OSI reference model. U.S. Pat. No. 6,046,980 and U.S. Pat. No. 6,591,299, as well as others incorporated by reference herein, disclose classification of data flows for use in a packet-based communications environment. FIG. 2A illustrates the concept associated with inside and outside addresses. As discussed above, in one embodiment, a flow specification object includes an "inside" and "outside" address relative to traffic management device 130. See FIG. 2A. For a TCP/IP packet, packet processor 82 can compute the inside and outside addresses based on the source and destination network addresses of the packet and the direction of the packet flow.

In one embodiment, packet processor 82 creates and stores control block objects corresponding to data flows in flow database 135. In one embodiment, control block object attributes include a pointer to a corresponding flow specification object, as well as other flow state parameters, such as TCP connection status, timing of last packets in the inbound and outbound directions, speed information, apparent round trip time, packet count, etc. Control block object attributes further include at least one traffic class identifier (or pointer(s) thereto) associated with the data flow, as well as policy parameters (or pointers thereto) corresponding to the identified traffic class. In one embodiment, control block objects further include a list of traffic classes for which measurement data (maintained by measurement engine 140) associated with the data flow should be logged. In one embodiment, to facilitate association of an existing control block object to subsequent packets associated with a data flow or connection, flow database 135 further maintains a control block hash table including a key comprising a hashed value computed from a string comprising the inside IP address, outside IP address, inside port number, outside port number, and protocol type (e.g., TCP, UDP, etc.) associated with a pointer to the corresponding control block object. According to this embodiment, to identify whether a control block object exists for a given data flow, packet processor 82 hashes the values identified above and scans the hash table for a matching entry. If one exists, packet processor 82 associates the pointer to the corresponding control block object with the data flow.

To allow for identification of service types (e.g., FTP, HTTP, etc.), packet processor 82, in one embodiment, is supported by one to a plurality of service identification tables in a relational database that allow for identification of a particular service type (e.g., application, protocol, etc.) based on the attributes of a particular data flow. Of course, other suitable data structures can be used to support the identification of service types, such as a set of hard-coded instructions, an XML file, and the like. In one embodiment, a services table including the following fields: 1) service ID, 2) service aggregate (if any), 3) name of service, 4) service attributes (e.g., port number, outside IP address, etc.), and 5) default bandwidth management policy. A service aggregate encompasses a combination of individual services (each including different matching criteria, such as different port numbers, etc.) corresponding to the service aggregate. When traffic management device 130 encounters a new flow, packet processor 82 analyzes the data flow against the service attributes in the services table to identify a service ID corresponding to the flow. In one embodiment, packet processor 82 may identify more than one service ID associated with the flow. In this instance, packet processor 82 associates the more/most specific service ID to the flow. For example, network traffic associated with a peer-to-peer file sharing service may be identified as TCP or HTTP traffic, as well as higher level traffic types such as the actual file sharing application itself (e.g., Napster, Morpheus, etc.). In this instance, packet processor 82 associates the flow with the most specific service ID. A traffic class maintained by traffic classification database 86 may be configured to include matching rules based on the service IDs in the services table. For example, a matching rule directed to HTTP traffic may simply refer to the corresponding service ID, as opposed to the individual attributes that packet processor 82 uses to initially identify the service.

In one embodiment, when packet processor 82 inspects a flow it may detect information relating to a second, subsequent flow (e.g., an initial FTP command connection being the harbinger of a subsequent data connection, etc.). Packet processor 82, in response to such flows populates a remembrance table with attributes gleaned from the first flow, such as IP addresses of the connection end points, port numbers, and the like. Packet processor 82 scans attributes of subsequent flows against the remembrance table to potentially associate the subsequent flow with the first flow and to assist in identification of the second flow.

A.2. Traffic Classification

Traffic classification engine 86 is operative to inspect packets in data flows, and apply matching rules corresponding to a plurality of traffic classes. Traffic classification engine 86, in one implementation, comprises a plurality of service type identification modules, each of which correspond to a set of service types. Each service type identification module analyzes one or more packets in a given data flow to attempt to identify a service type corresponding to the flow. A service type, in one implementation, can be a network protocol, a service, or a network-application. For example, one service type identification module can correspond to a network application, such as Citrix®, while another service type identification module can be dedicated to detecting Oracle® or PostgreSQL database traffic. Stilt other service type identification modules can classify HTTP flows, FTP flows, ICMP flows, RTP flows, NNTP, SMTP, SSL, DICOM and the like. In one implementation, traffic classification engine 86 passes pointers to received packets to each service type identification module, which then inspect the packets stored in the buffer memory. In one implementation, each service type identification module has an associated packet count threshold (in the aggregate, packets from server to client, or client to server) after which it no longer attempts to classify a data flow. In one implementation, the packet count threshold will vary across the service type identification modules. For example, a service type identification module dedicated to classifying Citrix® traffic may be able to classify a data flow with certainty after three packets. In many instances, application traffic management device 130 may have to encounter more than one packet corresponding to a data flow in order to finally classify the data flow. For example, the initial TCP handshake packets may only reveal IP address, port numbers and protocol identifiers. While this information may be sufficient to identify HTTP traffic, for example, additional packets (such as data packets) may reveal a more specific network application, such as an accounting application or peer-to-peer file sharing application, that utilizes HTTP. Accordingly, in one implementation, each service type identification module responds to receiving a pointer to a packet by 1) reporting a matching service type identifier and the desire to inspect more packets in the flow (to possibly identify a more specific service type identifier); 2) reporting a matching service type and no interest in inspecting subsequent packets in the flow; 3) reporting no matching service type identifier and the desire to inspect more packets in the flow; and 4) reporting no matching service type and no interest in inspecting subsequent packets in the flow.

To allow for identification of service types (e.g., FTP, HTTP, etc.), traffic classification engine 86, in one embodiment, is supported by one to a plurality of service identification tables in a relational database that allow for identification of a particular service type (e.g., application, protocol, etc.) based on the attributes of a particular data flow. Of course, other suitable data structures can be used to support the identification of service types, such as a set of hard-coded instructions, an XML file, and the like. In one embodiment, a services table including the following fields: 1) service ID, 2) service aggregate (if any), 3) name of service, 4) service attributes (e.g., port number, outside IP address, etc.), and a 5) default bandwidth management policy. A service aggregate encompasses a combination of individual services (each including different matching criteria, such as different port numbers, etc.) corresponding to the service aggregate. When application traffic management device 130 encounters a new flow, the service type identification modules of traffic classification engine 86 analyze the data flow against the service attributes in their respective services tables to identify a service ID corresponding to the flow. In one embodiment, traffic classification engine 86 may identify more than one service ID associated with the flow. In this instance, traffic classification engine 86 associates the more/most specific service ID to the flow. For example, network traffic associated with a peer-to-peer file sharing service may be identified according to a network protocol, such as TCP or HTTP traffic, as well as higher level, application-specific traffic types such as the actual file sharing application itself (e.g., Napster, Morpheus, etc.). In this instance, traffic classification engine 86 associates the flow with the most specific service ID. As a further example, an RTSP application data flow can be further classified to RTSP-Broadcast or RTSP-REALNET-TCP in the middle of the flow after a particular signature in the packets is encountered. In one implementation, traffic classification engine 86 writes the identified service type ID into the control block (flow) object corresponding to the data flow.

As discussed more fully below, service type identification, in one implementation, is a preliminary operation to the classification of a data flow according to the hierarchical traffic classification scheme configured by a network administrator. For example, a traffic class maintained by traffic classification engine 86 may be configured to include matching rules based on the service IDs in the services table. For example, a matching rule directed to HTTP traffic may simply refer to the corresponding service ID, as opposed to the individual attributes that the service type identification modules uses to initially identify the service. This implementation allows for a variety of hierarchical traffic classification configurations, such as the configuration of child traffic classes that further classify HTTP traffic on the basis of a network application, a range of IP addresses, and the like. Still further, the service type identifiers can correspond to a specific network application (e.g., Napster, Citrix, NetIQ, Oracle, Skype, etc.) and more generally to network protocols or services, such as IP, TCP, HTTP, SOAP, XML, UDP, FTP, SMTP, FTP, UDP, etc.

A traffic class comprises a set of matching rules or attributes allowing for logical grouping of data flows that share the same characteristic or set of characteristics. In one implementation, the matching rules can correspond to the service type identifiers discussed above, as well as other data flow attributes, such as the network interface on which the packets are received by application traffic management device, whether the server is the inside or outside host (see above), non-standard and standard port numbers, host IP address or subnet, MAC address, application-specific strings, diffserv codes, MPLS tags, VLAN tags, and the like. In one embodiment, each traffic class has at least one attribute defining the criterion(ia) used for identifying a specific traffic class. In one implementation, the attributes defining a given traffic class can be based on explicitly presented attributes of one or more packets corresponding to a data flow (as discussed above), or be based on behavioral attributes of the end systems associated with the flow. The U.S. patent applications identified above disclose various network traffic classification mechanisms that can be incorporated into embodiments of the present invention. For example, a traffic class can be defined by configuring an attribute defining a particular IP address or subnet. Of course, a particular traffic class can be defined in relation to a plurality of related and/or orthogonal data flow attributes. U.S. Pat. Nos. 6,412,000 and 6,591,299, and U.S. patent application Ser. No. 10/039,992 describe some of the data flow attributes that may be used to define a traffic class, as well as the use of hierarchical classification structures to associate traffic classes to data flows. In one embodiment, application traffic management device 130 includes functionality allowing for classification of network traffic based on information from layers 2 to 7 of the OSI reference model. Application traffic management device 130 can be configured to include matching rules that define a plurality of network applications commonly found in enterprise networks, such as database applications, Citrix® flows, ERP applications, and the like. As discussed below, the matching rules or attributes for a traffic class may be based on various types of node behavior, such as the number of concurrent connections of the inside or outside host.

In one embodiment, application traffic management device 130 is configured to include a predefined set of traffic classes based upon a knowledge base gleaned from observation of common or known traffic types on current networks. Application traffic management device 130, in one embodiment, also allows an administrator to manually create a traffic class by specifying a set of matching attributes. As discussed above, administrator interface 150, in one embodiment, allows for selection of a traffic class and the configuration of traffic management policies for the selected traffic class. Administrator interface 150, in one embodiment, also allows for the selection and arrangement of traffic classes into hierarchical reference trees. In one embodiment, traffic classification engine 86 also stores traffic classes added by the traffic discovery module. Furthermore, as discussed below, application traffic management device 130 may also include traffic class discovery functionality that automatically adds traffic classes to traffic classification engine 86 in response to data flows traversing the device. Automatic network traffic discovery and classification (see below) is disclosed in U.S. Pat. Nos. 6,412,000, 6,457,051, and 6,591,299, which are incorporated herein by reference.

Traffic classification engine 86, in one implementation, stores traffic classes associated with data flows that traverse access link 21. Traffic classification engine 86, in one embodiment, stores the traffic classes and corresponding data (e.g., matching rules, policies, partition pointers, etc.) related to each traffic class in a hierarchical tree. This tree is organized to show parent-child relationships—that is, a particular traffic class may have one or more subordinate child traffic classes with more specific characteristics (matching rules) than the parent class. For example, at one level a traffic class may be configured to define a particular user group or subnet, while additional child traffic classes can be configured to identify specific application traffic associated with the user group or subnet. U.S. application Ser. No. 10/334,467, as well as other patents and patent applications identified above, disclose how traffic classification engine 86 traverses the hierarchical tree to match a data flow to a leaf traffic class node.

In one embodiment, the root traffic classifications are "/Inbound" and "/Outbound" data flows. Any data flow not explicitly classified is classified as "/Inbound/Default" or "/Outbound/Default". The "LocalHost" traffic class corresponds to packets and data flows destined for application traffic management device 130, such as requests for stored measurement data, traffic class mapping packets, or device configuration changes. In one embodiment, traffic classification engine 86 attempts to match to a leaf traffic class node before proceeding to remaining traffic class nodes in the hierarchical configuration. If a traffic class is found, the traffic classification engine 86 stops the instant search process and returns the identified traffic classification. Of course, one skilled in the art will recognize that alternative ways for traversing the hierarchical traffic class configuration can be implemented. For example, traffic classification engine 86 may be configured to traverse all traffic class nodes at a given level before proceeding to lower levels of the traffic classification tree.

In one embodiment, administrator interface 150 displays the traffic class tree and allows for selection of a traffic class and the configuration of bandwidth utilization controls for that traffic class, such as a partition, a policy, or a combination thereof. Administrator interface 150 also allows for the arrangement of traffic classes into a hierarchical classification tree. Application traffic management device 130 further allows an administrator to manually create a traffic class by specifying a set of matching rules and, as discussed below, also automatically creates traffic classes by monitoring network traffic across access link 21 and classifying data flows according to a set of criteria to create matching rules for each traffic type. In one embodiment, each traffic class node includes a traffic class identifier; at least one traffic class (matching) attribute; at least one policy parameter (e.g., a bandwidth utilization control parameter, a security policy parameter, etc.), a pointer field reserved for pointers to one to a plurality of child traffic classes. In one embodiment, traffic classification engine 86 implements a reference tree classification model wherein separate traffic classification trees can be embedded in traffic class nodes of a given traffic classification tree. U.S. application Ser. No. 10/236,149, incorporated by reference herein, discloses the use and implementation of embeddable reference trees.

A.2.a. Automatic Traffic Classification

As discussed above, a traffic discovery module (not shown), in one implementation, analyzes data flows for which no matching traffic class was found in traffic classification database 86. The traffic discovery module, in one embodiment, is operative to apply predefined sets of matching rules to identify a traffic class corresponding to non-matching data flows. In one implementation, traffic discovery module operates on data flows classified as either /Inbound/Default or Outbound/Default. In one embodiment, the traffic discovery module is configured to include a predefined set of traffic classes based upon a knowledge base gleaned from observation of common or known traffic types on current networks. In one embodiment, the traffic discovery module creates traffic classes automatically in response to data flows traversing traffic management device 130 and stores such traffic classes in traffic classification database 86. Automatic traffic classification is disclosed in U.S. Pat. Nos. 6,412,000, 6,457,051, and 6,591,299, which are incorporated herein by reference.

As discussed above, the traffic discovery module applies one or more traffic discovery thresholds when deciding whether to present or add newly discovered traffic classes. In one embodiment, the traffic discovery module must detect a minimum number of data flows within a predefined period for a given traffic type before it creates a traffic class in traffic classification database 86. In one embodiment, auto-discovered traffic classes are automatically assigned predefined traffic management policies. U.S. patent application Ser. No. 09/198,051, incorporated by reference herein, discloses automatic assignment of traffic policies for discovered traffic classes.

A.3. Application of Traffic Management Policies to Data Flows

As discussed above, traffic policy module 84 applies the traffic policies identified in the control block object corresponding to various flows. As discussed above, certain traffic policies can be differentiated network service policies, such as selection of certain MPLS tags, diffsery codes, and the like. Accordingly, in one implementation, traffic policy module 84 is operative to add the required markings or tags to the packets in the data flow as required by the differentiated services technologies or protocols employed by differentiated services network 50. In one implementation, to support the implementation of the differentiated services policies described herein, a table or other data structure stores network service class identifiers in association with the tags, labels, codes or other information required to designate packets for the given class of service. Traffic policy module 84, in one implementation, consults this data structure after obtaining the service class identifier from the control block object to retrieve the information required to appropriately mark the packets. In some implementations, traffic policy module 84 may also apply other traffic policies or controls, such as bandwidth utilization controls, security policies and the like.

For example, traffic policy module 84, in one implementation, is operative to enforce bandwidth utilization controls, in addition to or in lieu of differentiated services policies, on data flows traversing access link 21. A bandwidth utilization control for a particular data flow can comprise an aggregate control bandwidth utilization control, a per-flow bandwidth utilization control, or a combination of the two. Traffic policy module 84 can use any suitable functionality to enforce bandwidth utilization controls known in the art, including, but not limited to weighted fair queuing, class-based weighted fair queuing, Committed Access Rate (CAR) and "leaky bucket" techniques. Traffic policy module 84 may incorporate any or a subset of the TCP rate control functionality described in the cross-referenced U.S. patents and/or patent applications set forth above for controlling the rate of data flows. Bandwidth management device 130, however, can also be configured to implement a variety of different policy types, such as security policies, admission control policies, redirection policies, caching policies, transcoding policies, and network address translation (NAT) policies. Of course, one of ordinary skill in the art will recognize that other policy types can be incorporated into embodiments of the present invention.

A.3.a. Aggregate Bandwidth Utilization Control

An aggregate bandwidth utilization control operates to manage bandwidth for aggregate data flows associated with a traffic class. An aggregate bandwidth utilization control can be configured to essentially partition the available bandwidth corresponding to a given access link. For example, a partition can be configured to protect a network traffic class by guaranteeing a defined amount of bandwidth and/or limit a network traffic class by placing a cap on the amount of bandwidth a traffic class can consume. Such partitions can be fixed or "burstable." A fixed partition allows a traffic class to use in the aggregate a defined amount of bandwidth. A fixed partition not only ensures that a specific amount of bandwidth will be available, but it also limits data flows associated with that traffic class to that same level. A burstable partition allows an aggregate traffic class to use a defined amount of bandwidth, and also allows that traffic class to access additional unused bandwidth, if needed. A cap may be placed on a burstable partition, allowing the traffic class to access up to a maximum amount of bandwidth, or the burstable partition may be allowed to potentially consume all available bandwidth across the access link. Partitions can be arranged in a hierarchy—that is, partitions can contain partitions. For example, the bandwidth, or a portion of the bandwidth, available under a parent partition can be allocated among multiple child partitions. In one embodiment, at the highest level, a partition exists for all available outbound bandwidth, while another partition exists for all available inbound bandwidth across the particular access link. These partitions are then sub-dividable to form a hierarchical tree. For example, an enterprise employing static partitions may define a static partition for a PeopleSoft software application traffic class, and sub-divide this parent partition into a large burstable child partition for its human resources department and a smaller burstable child partition for the accounting department. U.S. patent application Ser. No. 10/108,085 includes a discussion of methods for implementing partitions, as well as novel solution for implementing partitions arranged in a hierarchical allocation scheme.

In one embodiment, a partition is created by selecting a traffic class and configuring a partition for it. As discussed above, configurable partition parameters include 1) minimum partition size (in bits per second); 2) whether it is burstable (that is, when this option is selected, it allows the partition to use available excess bandwidth; when the option is not selected the partition has a fixed size); and 3) maximum bandwidth to be used when the partition bursts.

A.3.b. Per-Flow Bandwidth Utilization Controls

Traffic policy module 84 is also operative to enforce per-flow bandwidth utilization controls on traffic across access link 21. Whereas aggregate bandwidth utilization controls (e.g., partitions, above) allow for control of aggregate data flows associated with a traffic class, per-flow bandwidth utilization controls allow for control of individual data flows. In one embodiment, traffic policy module 84 supports different bandwidth utilization control types, including, but not limited to, priority policies, rate policies, and discard policies. A priority policy determines how individual data flows associated with a traffic class are treated relative to data flows associated with other traffic classes. A rate policy controls the rate of data flows, for example, to smooth bursty traffic, such as HTTP traffic, in order to prevent a TCP end system from sending data packets at rates higher than access link 21 allows, thereby reducing queuing in router buffers and improving overall efficiency. U.S. patent application Ser. No. 08/742,994 now U.S. Pat. No. 6,038,216, incorporated by reference above, discloses methods and systems allowing for explicit data rate control in a packet-based network environment to improve the efficiency of data transfers. Similarly, U.S. Pat. No. 6,018,516, incorporated by reference above, methods and systems directed to minimizing unneeded retransmission of packets in a packet-based network environment. A rate policy can be configured to establish a minimum rate for each flow, allow for prioritized access to excess available bandwidth, and/or set limits on total bandwidth that the flow can consume. A discard policy causes traffic policy module 84 to discard or drop data packets or flows associated with a particular traffic class. Other policy types include redirection policies where an inbound request designating a particular resource, for example, is redirected to another server.

A.4. Measurement Engine and Management Information Base

As discussed above, measurement engine 140 maintains data associated with the operation of traffic management device 130 and the computer network environment, including data allowing for measurement of bandwidth utilization across access link 21 with respect to a plurality of bandwidth utilization and other network statistics. The information obtained by these modules may be used in the analysis of network application performance, discussed below. In one implementation, measurement engine 140 is operative to record or maintain numeric totals of a particular measurement variable at periodic intervals on a traffic classification basis. For example, measurement engine 140 monitors the number of inbound and outbound packets, the number of flows, peak and average rates, as well as the number of bytes, traversing traffic management device 130 on an aggregate (access link), partition, and/or traffic class level. Other network statistics can include the number of TCP packets, the number of retransmitted TCP packets, the peak number of concurrently active TCP flows or other connections, etc. Measurement engine 140 also maintains data relating to operation of traffic management device 130, such as aggregate byte count, aggregate packet count, the TCP data packet count, the TCP retransmit packet count, the TCP tossed retransmit packet count, the peak number of active TCP flows. Measurement engine 140 can also maintain network statistics associated with the service classes supported by differentiated services network, such as aggregate byte count, aggregate packet count, the TCP data packet count, the TCP retransmit packet count, the TCP tossed retransmit packet count, the peak number of active TCP flows. Measurement engine 140 further maintains data relating to traffic classes, such as, for a given traffic class: the packet count in the traffic class, the TCP data packet count in the class, the TCP retransmit packet count in the class, and the peak number of active TCP flows in the class, as well as a "class hits" count characterizing the number of flows that were matched to a given traffic class. Of course, measurement engine 140 can be configured to record and maintain a variety of network utilization and performance related data.

In one embodiment, measurement engine 140 monitors operation of traffic management device 130 and maintains values (e.g., packet counts, peak bandwidth utilization values, and other quantities) for various network operation, utilization and performance statistics. In one embodiment, measurement engine 140 maintains such values in volatile memory and, at periodic intervals, stores the data in persistent memory, such as a hard drive, with a time stamp and clears the network statistic values in the volatile memory space. As discussed above, network statistic data can be stored in association with identifiers for access link 21, as well as for various traffic classes associated with the current configuration of traffic management device 130. In one embodiment, measurement engine 140 stores network statistic data in persistent memory at one-minute intervals; however, other suitable time intervals can be chosen as a matter of engineering design or administrative need. In addition, the persistent memory, in one embodiment, includes sufficient capacity to store a large amount of network management data, such as data for a period of 24, 48, or 72 hours.

In one embodiment, the time interval at which measurement engine 140 stores network management data in persistent memory is a configurable parameter. Additionally, measurement engine 140 includes APIs allowing other modules to access the raw measurement data. In one embodiment, measurement engine 140 includes APIs and associated functionality that aggregates raw measurement data over specified time intervals (e.g., the last hour, 15 minutes, day, etc.).

Management information base 138 maintains a database of standard and extended network objects maintaining counts and other statistics relating to the operation of bandwidth management device 30. In one embodiment, the data maintained by management information base 138 can be extracted using Simple Network Management Protocol (SNMP) queries. In one embodiment, management information base 138 is maintained in dynamic memory, such as Random Access Memory. For example, the management information base 138 maintains counts related to the operation of the inside and outside network interfaces associated with the bandwidth management device 30, such as the number of bytes transmitted from an interface, the number of bytes received on an interface, the number of queued packets, transmission error counts, etc. Management information base 138 also maintains counts related to the operation of different modules (e.g., packet processor 82, traffic policy module 84, etc.) included in traffic management device 130.

A.5. Monitoring Network or Application Performance

As discussed above, application traffic monitoring module 88 is operative to monitor the packet path in the inbound and outbound directions to gather various measurement data and compute the performance of one or more selected traffic classes. In a typical configuration, the traffic classes for which performance is monitored generally correspond to network applications that an enterprise deems important or critical. In one implementation, application or network performance is determined relative to response times which is a primary indicator of a user's experience with a network application. In one implementation, application traffic monitoring module 88 is operative to provide performance related statistics like network delay, server delay, and congestion metrics for selected applications or other user-defined traffic classes, such as individual hosts, subnets, and for any transaction-oriented TCP traffic class. Application traffic monitoring module 88 can break down the total observed delay, for each response-time measurement into network delay (time spent in transit) and server delay (time the server used to process the request). The location of traffic management device 130 at strategic points in a given network environment—monitoring all the traffic that passes—facilitates the accurate determination of response times. That is, because traffic management device 130 encounters all data flows transmitted to and from network 40, it can readily calculate the time network traffic spends traveling between a client and a server, the time used by the server, and the time spent on either side of traffic management device 130 itself.

Application traffic monitoring module 88, in one implementation, can make the following measurements or response time determinations:

1) total delay: The total time (in milliseconds) a transaction requires, beginning with a client's request and ending upon receipt of the response, corresponding to the end user's view of the time it takes for a transaction to complete.

2) network delay: The time (in milliseconds) spent in transit when a client and server exchange data. If a transaction requires a large quantity of data to be transferred, it is divided and sent in multiple packets. Network delay includes the transit time for all packets involved in a request-response transaction. The amount of time the server uses for processing a request is not included.

3) server delay: The time (in milliseconds) the server uses to process a client's request after it receives all required data. The server delay is the time after the server receives the last request packet and before it sends the first packet of response (not receipt acknowledgment, but actual response content). This is the time the server takes to process the client's request.

4) normalized network delay: The time (in milliseconds) per kilobyte spent in transit when a client and server exchange data. If a transaction requires a large quantity of data to be transferred, it is divided and sent in multiple packets. Because network delay increases as transaction size increases, it can be misleading when comparing times. Normalized network delay eliminates size as a factor to facilitate comparisons across flows and applications.

5) round trip time (RTT): The time (in milliseconds) spent in transit when a client and server exchange one small packet. Even if a transaction's data is split into multiple packets, RTT, includes only one round trip of a single packet between client and server.

6) Packet exchange time (PET): The time (in milliseconds) between a packet's departure from traffic management device and receipt of the corresponding acknowledgment. This metric reflects only the delay for the network on one side of traffic management device 130. U.S. application Ser. No. 09/710, 442 discloses methods and systems for monitoring network delay on an application-level basis attributable to different networks by monitoring data flows at a demarcation point between the two networks.

In one implementation, traffic management device 130 can be configured to initiate synthetic web or other TCP transactions at periodic intervals to verify the availability of critical hosts. This activity is similar to scheduled pings or SNMP polls, but has the added advantage of the functionality of application traffic monitoring module 88 being applied to analyze synthetic transaction behavior and response times, rendering the ability to profile network and host behavior over time.

A.5.a. Calculating Transit Delays

To compute the delay measurements discussed above, application traffic monitoring module 88 tracks the course of a client-server transaction, making various packet arrival time and size observations, and uses information about a TCP connection to differentiate one portion of the exchange from another in order to compute accurate performance statistics. FIG. 5 illustrates the typical components associated with a TCP connection. FIG. 5 is a standard TCP diagram showing the course of a network transaction over time. Arrows indicate packets traveling the network between client and server. Time increases as one descends the diagram, with successive event times noted as TN, T1 representing the first event and T22, the last.

As FIG. 5 illustrates, a client initiates a server connection with a SYN at time T1. Application traffic monitoring module 88 notes the SYN at time T2 and forwards it along to the server. The server responds with a SYN-ACK at time T3. Application traffic monitoring module 88 notes the SYN-ACK at time T4, passing it along as shown. TCP stacks usually respond with a SYN-ACK very rapidly, within the kernel and with no context switches. The SYN-ACK follows the SYN almost immediately. Therefore, time T4 minus time T2 results in an accurate measure of the round-trip network delay between traffic management device 130 and the server. This interchange produces the first quantity, the server transit delay (STD):

$$STD = T4 - T2$$

The client receives the SYN-ACK and issues the final ACK of the three-way handshake at time T5. Application traffic monitoring module 88 notes the ACK at time T6, passing it along to the server. In one implementation, it is reasonably assumed that no processing transpires between the client's receipt of the SYN-ACK and its own corresponding ACK at time T5. Time T6 minus time T4 yields an accurate measure of the round-trip network delay between the client and traffic management device 130. The client transit delay (CTD):

$$CTD = T6 - T4$$

Putting together the server transit delay (STD) and the client transit delay (CTD) yields the total delay between the client and the server for a single round trip.

$$RTT(\text{Round-Trip Time}) = STD + CTD$$

A.5.b. Determining the Server Delay

The client initiates its request at time T8, arriving at the traffic management device 130 at time T9. For large requests, the request is divided into multiple packets. The TCP diagram of FIG. 5 eliminates the server's corresponding ACKs to simplify the picture, because these ACKs are not material to the calculations described herein. The last request packet, sent at time T11, has its Push Flag set to one indicating it is the final packet. Traffic management device 130 notes the time of this last request packet at T12. After the last request packet arrives at the server at time T13, the server assembles the request, conducts whatever processing is required for the request, and assembles its response. The server sends the first packet (of potentially several response packets) at time T14.

Time T14 minus time T13 is the actual server-processing time required for the request, but these times are not visible to application traffic monitoring module 88. However, application traffic monitoring module 88 knows that the server's processing time occurred after it saw the last request packet and before it saw the first response packet (time T15 minus time T12). Additionally, it knows that another component of this interval was the transit time from traffic management device 130 to the server and back again. Conveniently, it already has that figure—i.e., the server transit delay (STD). In addition, there is a small amount of time spent serializing the bits in the response packet and preparing them for their bit stream. This time was not included in the original server transit delay because the SYN and ACK packets are extremely small. Application traffic monitoring module 88, in one implementation, knows the size of the packet, calculates this preparation time accordingly (.1), and adds it to the STD before subtracting the sum from the time difference. Therefore, $$\text{Server Delay} = (T15 - T12) - (STD + \Delta1)$$

A.5.c. Determining the Total Delay

The termination of a transaction is key to calculating the total delay; however, it is not always obvious when a transaction ends. The combination of a Push flag from the server and its corresponding ACK from the client frequently signal the end of a transaction. But long transactions often insert Push flags throughout the transaction. In addition to monitoring Push flags, application traffic monitoring module 88 uses a timer to track transactions and uses the following rules:

1) If a Push flag seems to indicate a transaction's end, but the server continues sending more data, the timer continues to advance.

2) If the client sends a new request, application traffic monitoring module 88 ends the last transaction and records the last time noted.

3) If there is no activity from either the server or the client, application traffic monitoring module 88 considers the transaction complete and records the last time noted.

4) When the connection ends, traffic management device 130 sees the FIN and records the last time noted.

Using these techniques, application traffic monitoring module 88 notes the last response packet at time T18, makes sure that it saw all required ACKs for the request packets, and verifies that the last response packet indeed represented the end of the transaction. After the client receives the final response packet at time T19, it sends an ACK. The ACK reaches traffic management device 130 at time T21. The client's perspective of response time starts with sending the first request packet (T8) and ends with receipt of the final response packet (T20). Application traffic monitoring module 88 sees that interval as time T9 to time T21. Although this is a close estimate of the client's view, it misses some extra preparation time for serializing the first request packet, assuming it is larger than the final ACK. Because application traffic monitoring module 88 knows the packet-size difference, however, it can calculate this small discrepancy (Δ2). Therefore, $$\text{Total delay} = (T21 - T9) + \Delta 2$$

A.5.d. Determining Network Delay

Once application traffic monitoring module 88 computes the server delay and the total delay, it can calculate the amount of time the transaction spent in transit.

$$\text{Network delay} = (\text{Total delay}) - (\text{Server delay})$$

Whereas the RTT represents the transit time for just one round trip, the network delay reflects all transit time for the transaction. If the transaction's data is large, multiple packets need to make their way to and from the server. Only the network delay reflects this overhead. The network delay is not necessarily an even multiple of the RU because multiple packets are not sent consecutively but tend to overlap to varying degrees. In addition, because network and total delay are products of transaction size, ping times and RTM measurements are not comparable.

A.5.e. Aggregation and Analysis of Response Time Measurements

Application traffic monitoring module 88, in one implementation, collects packet arrival time observations and sizes and computes response time measurements for the data flows and stores the computed measurement values in one process. A separate process accesses the stored values to analyze the performance of one or more network applications in relation to one or more performance thresholds. Depending on the results of the analysis, this process can result in changes to the differentiated service policies applied to a given network application or other traffic class. Application traffic monitoring module 88, in one implementation, collects response time measurements associated with given traffic class identifiers, maintains the data in volatile memory for a given time interval (e.g., 1 minute), and then stores the data in non-volatile memory (similar to measurement engine 140). In another implementation, measurement engine 140 can be configured to store the relevant measurement variables. In another implementation, application traffic monitoring module 88 can average the response time measurements over the time interval and stores the average response time measurements for each traffic class. Application traffic monitoring module 88 further includes APIs and associated functionality that aggregates raw response time measurement data over specified time intervals (e.g., the last hour, 15 minutes, day, etc.) on a traffic class or network-wide basis. A separate process, using these APIs, can compute average response times over desired intervals and compare these response times to pre-configured performance thresholds.

Traffic management device 130, in one embodiment, features a plug-in architecture that facilitates, among other things, updates to application traffic monitoring module 88 (as well as other) functionality. A plug-in can contain data that extends and/or modifies one or more tables or data structures used by application traffic monitoring module 88 and/or updated code. Application traffic monitoring module 88, in one embodiment, uses a shared (dynamic link) library loader to add analysis plug-ins to an existing software release during a boot sequence. The shared library loader, in one embodiment, is operative to determine whether any plug-ins exist (e.g., by checking a directory or other reserved file space), and to extend/modify tables or other data structures and/or register specific code as required. This plug-in architecture can be used to extend or modify how traffic monitoring module 88 analyzes application performance and adjusts the differentiated services policies applied to various traffic classes.

In another embodiment, traffic management device 130 can be configured to include an embedded runtime environment (not shown) that is operative to execute application performance analysis scripts installed on traffic management device 130. Such an embodiment allows network administrators and others to create custom application performance analysis scripts tailored to a vast array of requirements, conditions and goals. In one embodiment, the embedded runtime environment is an object-oriented runtime environment, such as Python or Java®. The embedded runtime environment may be configured to include a runtime interpreter that interprets and executes scripts in source code form. In another embodiment, the embedded runtime environment may be configured to execute compiled application performance analysis scripts. In one such embodiment, the embedded runtime environment may include just-in-time compiler functionality to compile source code scripts into object or byte code form before execution. As discussed more fully below, traffic management device 130 stores one or more application performance analysis scripts operative to determine whether the performance of a given network application or other traffic class complies with one or more threshold criterion. In one embodiment, application performance analysis scripts are implemented as application performance analysis objects, which are instantiations of application performance analysis classes. In one embodiment, application performance analysis objects can be instantiated for each traffic management device 130 and maintained such that the state of the application performance analysis object can be pickled after execution to allow for certain data related to application performance analysis to persist. U.S. application Ser. No. 10/178,617, incorporated by reference herein, discloses the incorporation of embedded runtime environments into bandwidth management devices and the pickling of objects to persist data and variables.

In the following sections, a didactic example of a script is provided that analyzes the performance of a given traffic class and upgrades the service class corresponding to that traffic class if the measured performance falls below a threshold value. In one embodiment, administrator interface 150 allows network administrators to configure a differentiated network services policy that specifies a default service class, as well as a performance threshold. When a network administrator selects this configuration option for a given traffic class, the corresponding traffic class identifier, the default service class and the performance threshold are added to a dynamic configuration file. The performance analysis script of other functionality accesses this configuration file to determine for which traffic classes performance measurements should be analyzed. As the script provided below indicates, if the analyzed performance falls below the specified threshold for any given traffic class, the network service class for that traffic class is upgraded. In one embodiment, this is accomplished by overwriting the current network services class policy in traffic classification database 86 to an upgraded service class. Accordingly, as discussed above, when traffic management device 130 encounters subsequent data flows associated with that traffic class, the upgraded service class policy will be written into the control block object corresponding to the flow and, therefore, will be ultimately applied to the data flow. In addition, once network service for a given traffic class is upgraded, a separate process or analysis script, in one implementation, operates to determine when to downgrade the traffic class to its default differentiated service class.

A variety of implementations are possible. In one implementation, a traffic class is downgraded after some configured period of time after it was initially upgraded. For example, a traffic class may be upgraded and automatically downgraded after an hour (or other configurable period). If performance of that traffic class falls below the threshold, it will again be upgraded upon a subsequent operation of the performance analysis functionality discussed above. In one implementation, traffic management device 130 uses synthetic transactions to determine when a given traffic class should be downgraded. For example, by identifying one or more outside hosts associated with a given traffic class, traffic management device 130 can test performance of the network to these hosts using the default service class associated with the traffic class. If the PET performance associated with the synthetic transactions on the default (or lower service value) is less than a threshold value, the traffic class is downgraded to its default service level. In another implementation, application traffic monitoring module 88 analyzes the performance of non-upgraded flows that are still running over the lower, default service class. This can be accomplished by looking at the aggregate performance of all traffic and noting a statistically significant change from a baseline that was established at the time of upgrade. In another implementation, all data flows falling under a parent traffic class in the configuration hierarchy can be examined to determine when to downgrade a given traffic class. For instance, if a parent traffic class represented all traffic from the edge of network 40 to a given remote site, such as a data center (which excludes general Internet traffic), then application traffic monitoring module 88 can analyze the performance of other, non-upgraded child traffic classes of the parent traffic class to which the upgraded traffic class belongs.

A.5.f. Exemplary Implementation of Performance Analysis Scripts

As discussed above, in one implementation, the performance analysis scripts are executed by an object-oriented runtime environment. The embedded runtime environment, in one implementation supports "pickling," so that the various modules (set forth below) can maintain state information.

A.5.f.1. Strategy Module

Since there are different strategies and even different time intervals that one could adopt for upgrading and downgrading the path for a traffic class, one implementation of the present invention encapsulates those strategies in a class, which can then be subclassed in various ways without changing the main program. The main program, in one implementation, simply calls the "considerUpgrade" or "considerDowngrade" method, without having to know what strategy is in place for that traffic class. This is a standard object-oriented programming technique, and it allows for different traffic classes to have different strategies, and for the network administrator or other user to create custom strategies as well.

The following provides an example for the "abstract class" (or "superclass") for ClassEval:

```
class ClassEval:
""" The superclass. These are null implementations;
""" Subclasses fill in the details.
def_init_(self, className):
self.className=className
pass
def considerUpgrade (self, cl):
""" Since 'cl' is a PacketWiseObject, which is only meaningful at runtime, it cannot be pickled. Therefore, it is passed in as an argument, and the ClassEval must NOT save it as an instance variable (otherwise the pickling machinery tries to process it)
"""
return None
def considerDowngrade(self, cl):
""" See comments for considerUpgrade.
"""
return None
```

The following is a version of ClassEval, which measures the 'pkt-exch-time' (PET), see above, for a traffic class against a threshold ("if cl.ME.pkt_exch_time.last_15_minutes>self.threshold"). Note that any performance-related variable or combination of variables, and any supported time interval, could be used here, besides 'pkt-exch-time' and 'last-15-minutes.' As the following script provides, ClassEval, in one implementation, is configured with 1) 'evalTime', which is the normal time interval at which to consider upgrading; 2) 'downgradeTime', the time interval at which to consider downgrading the class; and 3) 'upgradeReEvalTime'—if a class was downgraded, this parameter specifies the time interval at which to reexamine performance, which could be sooner than "evalTime."

```
import ClassEval
import time
class ClassEvalSimple(ClassEval.ClassEval):
""" This eval class tests pkt_exch_time over the DS network for the last 15 minutes, against a fixed threshold.
"""
def_init_(self, name, threshold, evalTime, upgradeReEvalTime, downgradeWaitTime):
ClassEval.ClassEval._init_(self, name)
self.threshold=threshold
self.evalTime=evalTime
self.upgradeReEvalTime=upgradeReEvalTime
self.downgradeWaitTime=downgradeWaitTime
self.timeDowngraded=0
self.timeLastEval=0
def evalThreshold(self, cl):
now=time.time( )
self.timeLastEval=now
if        cl.ME.pkt_exch_time.last_15_minutes>self.threshold:
self.timeUpgraded=now
return 1
return None
def considerUpgrade(self, cl):
""" Rules:
1) if already downgraded this one again, then recheck its performance sooner than we otherwise would.
2) if not, then check it at the regular interval """
now=time.time( )
if self.downgradeTime>0:
if                                                                now—self.timeDowngraded>self.upgradeReEvalTime:
return self.evalThreshold(cl)
if now—self.timeLastEval>self.evalTime:
return self.evalThreshold(cl)
return None
def considerDowngrade(self, cl):
""" In this version, try downgrading every configured interval.
"""
now=time.time( )
if now—self.timeUpgraded>self.downgradeWaitTime:
return 1
return None
```

Other implementations are possible. In one implementation, the considerDowngrade method could be configured to check whether application performance actually improved. If application performance did not improve, the considerDowngrade method could simply reverse the upgrade for that traffic class. Note that the methods called by the main module, in the implementation shown, all have a 'cl' argument; this is an example of the concern that C or other native code objects not be exposed to the pickling mechanism implemented by the runtime environment. The class never saves that 'cl' as an instance variable 'self.cl'.

In addition, more complex schemes can be accommodated within the framework set forth above. For example, the strategy module can be configured to learn from historical events. For example, the strategy module can, in one implementation, be configured to measure the performance of synthetic transactions on a separate traffic class, which is assumed to be permanently on the default or lowest service class. This can be used to judge, relative to "good" and "bad" threshold values, whether downgrading an application would be likely to result in acceptable performance. (For the pkt-exch-time variable, "good" is a small number, and "bad" is a large number.) Whenever an application is successfully downgraded (meaning, it no longer requires upgrading), the "good" level of synthetic transaction performance is recorded.

The strategy module, in one implementation, can also implement a certain amount of hysteresis, since frequent changes to the service class applied to a given application may be undesirable. Therefore, in one implementation, the strategy module is configured to raise the "good" threshold slowly, similar to TCP slow-start. When an application is unsuccessfully downgraded, the "bad" level is also recorded and used as the "bad" threshold value. The strategy module does not attempt to downgrade a given traffic class if the observed performance of the synthetic transactions is not better than the recorded "bad" level.

For didactic purposes, assume the following example. In the past, a synthetic transaction PET level of 150 has generally indicated acceptable performance levels for a given service class. In the more recent past, however, a "good" threshold level of 250 has resulted in acceptable application performance after being downgraded. However, at that point a downgrade ultimately fails. Again, like a TCP slow start, strategy module drops the "good" threshold level back down to a more conservative one, synthPreviousGoodLevel. This level will never rise beyond that of the first successful upgrade. Thus, over time, a reasonably narrow interval of synthetic transaction performance is learned. The following script provides an exemplary implementation of the foregoing scheme.

```
import PacketWiseObject
import ClassEval
import time
import sys
class ClassEvalSynth(ClassEval.ClassEval):
""" This eval class tests pkt_exch_time for the last 15 minutes,
    against a fixed threshold. It also uses a special traffic class
    whose policy is ALWAYS the 'normal' link, presumed to
    be firing synthetic transactions at the relevant app. This is
    used to assess when a downgrade would be likely to succeed.
The strategy for downgrading based on synthetic transaction
    performance is analogous to TCP slow-start: LOWER the
    threshold readily, but RAISE it only gradually.
"""
def_init_(self, name, threshold, evalTime, upgradeReEvalTime, downgradeWaitTime, synthClassName):
    ClassEval.ClassEval._init_(self, name)
    self.threshold=threshold
    self.evalTime=evalTime
    self. upgradeReEvalTime=upgradeReEvalTime
    self. downgradeWaitTime=downgradeWaitTime
    self.timeDowngraded=0
    self.timeUpgraded=0
    self.timeLastEval=0
    self.synthClassName=synthClassName
    # the variables used for "slow-raise"
    self.synthGoodLevel=0
    self.synthTestLevel=0
    self.synthPreviousGoodLevel=0
    self.synthPreviousBadLevel=sys.maxint
def evalThreshold(self, cl):
    now=time.time( )
    self.timeLastEval=now
    if cl.ME.pkt_exch_time.last__15_minutes>self.threshold:
        self.timeUpgraded=now
        self.timeDowngraded=0
        return 1
    return None
def considerUpgrade(self, cl):
    """ Rules:
    1) if we already downgraded this one again, then we want
       to recheck its performance sooner than we otherwise
       would.
    2) if not, then check it at the regular interval
    """
    now=time.time( )
    if self.timeDowngraded>0: # we downgraded him
        if now—self.downgradeWaitTime>self.upgradeReEvalTime:
            doUpgrade=self.evalThreshold(cl)
            if doUpgrade:
                downgradeWorked=0
            else:
                downgradeWorked=1
            self.recomputeSynthLevels(cl, downgradeWorked)
            return doUpgrade
    if now—self.timeLastEval>self.evalTime:
        doUpgrade=self.evalThreshold(cl)
        return doUpgrade
    return None
def recomputeSynthLevels(self, cl, downgradeWorked):
    """ given that we downgraded the app, and it either worked
        or didn't, reevaluate the levels at which we'll consider
        doing this in the future.
    """
    if downgradeWorked:
        if self.synthTestLevel>self.synthGoodLevel:
            if self.synthTestLevel>self.synthGoodLevel:
                if self.synthPreviousGoodLevel==0:
                    # only do this once
                    self.synthPreviousGoodLevel=
                        self.synthGoodLevel
                # move ¼ of the distance to the level we just
                # succeeded at, but
                # only if that's not a previously-bad level
                temp=self.synthGoodLevel+(self.synthTestLevel–
                    self.synthGoodLevel)/4
                if temp<self.synthPreviousBadLevel:
                    self.synthGoodLevel=temp
    else: # downgrading didn't work
        if self.synthTestLevel<self.synthPreviousBadLevel:
            self. synthPreviousBadLevel=self.synthTestLevel
        if self.synthTestLevel<self.synthGoodLevel:
            self.synthGoodLevel=self.synthPreviousGoodLevel
            self.synthPreviousGoodLevel=0
def considerDowngrade(self, cl):
    """ In this version, we measure the performance of the
        synthetic transactions
    on the 'normal' link. If, in the past, we have successfully
        downgraded the app
    when conditions were 'similar' to this, we'll do it again.
    """
    now=time.time( )
    if now—self.timeUpgraded<self.downgradeWaitTime:
        return None
    clSynth=PacketWiseObject.TClassObject(self.synthClassName)
    current=clSynth.ME.pkt_exch_time.last__15_minutes
    if current<self.synthGoodLevel: # do it
```

```
    self.synthTestLevel=current
    self.timeDowngraded=now
    self.timeUpgraded=0
    return 1
  elif current<self.synthPreviousBadLevel:
    self.synthTestLevel=current
    self.timeDowngraded=now
    self.timeUpgraded=0
    return 1
  return None
```

One of ordinary skill in the art will immediately see that that many other algorithms are possible. For example, other performance-related variables, such as "tcp-efficiency %" (the ratio of non-retransmitted bytes to total bytes) in the synthetic transaction class could also be measured.

A.5.f.2. Budget Module

In another implementation, a budget module can be created to keep track of and implement a utilization budget for higher classes of differentiated network services. Since this would depend on the differentiated network services provider's billing plan, it is impossible to anticipate all variations. Accordingly, the script-oriented runtime environment according to one implementation allows network administrators or other end users to create their own budget class. In one implementation, the superclass for Budget is:

```
class Budget:
  """ The base class for an object which monitors the budget
    for a higher service class. Particular subclasses may
    work off the number of bytes transferred, the time that
    the DS class was used, or any other budgetary strategy
    that makes sense. """
  def_init_(self):
    pass
  def addFastClass(self, className):
    pass
  def removeFastClass(self, className):
    pass
  def update(self, criticalClasses):
    pass
  def allowMoreFastClasses(self):
    # return a 1 if more upgrades are permitted; 0 if not
    return 1
```

The following script provides an implementation of the budget class, where the "budget" is based on the number of bytes transferred per month. The BytesBudget object, in one implementation, maintains its own list of the upgraded traffic classes, so it can accurately count them only when they are actually upgraded, and not when they're downgraded. The variable 'cl.ME.bytes.this_month' is the aggregate number of bytes transmitted over the current month. In one implementation, this variable is maintained by measurement engine 140 for all traffic classes.

```
  import Budget
  from time import*
  class BytesBudget(Budget.Budget):
    """ This class keeps a dictionary of every higher priority
      traffic class, and for each, its 'bytes.last_month' total the
      last time it was checked. It uses that to keep a global
      'bytesThisMonth' of all the bytes used by all higher
      priority traffic classes.
    """
    def_init_(self, bytesLimit):
      Budget.Budget._init_(self)
      self.bytesLimit=bytesLimit
      self.bytesThisMonth=0
      self.fastClasses={ }
      self.month=localtime(time( ) [1]
    def addFastClass(self, className):
      self.fastClasses[className]=0
    def removeFastClass(self, className):
      del self.fastClasses[className]
    def zeroNumbers(self):
      for className in self.fastClasses.keys( ):
        self.fastClasses[className]=0
      self.bytesThisMonth=0
    def update(self, criticalClasses):
      """ 'criticalClasses' is a way of passing the Packet-
        WiseObjects, which are runtime state and thus should
        not get pickled with this object.
      """
      # if the month's rolled over, zero everything:
      if localtime(time( )[1] !=self.month:
        zeroNumbers(self)
      for className in self.fastClasses.keys( ):
        cl=criticalClasses[className]
        newBytesThisMonth=cl.ME.bytes.this_month
        self.bytesThisMonth+=newBytesThisMonth-self-
          .fastClasses[className]
        self.fastClasses[className]=newBytesThisMonth
    def allowMoreFastClasses(self):
      # return a 1 if more upgrades are permitted; 0 if not
      if self.bytesThisMonth<self.bytesLimit:
        return 1
      return 0
```

A.5.f.3. Main Program

In one implementation, the scripts further include a main program module that periodically activates to call the considerUpgrade and considerDowngrade methods discussed above. The initialization call in such a main program, in one implementation, can look like the following:

definitialize(fileName, budgetObj, criticalClasses, dscpFast, dscpNormal)

The variables in the initialization call mean:

fileName—the file where the state of the system is to be pickled budgetObj—a subclass of the Budget superclass criticalClasses—a Python "dictionary", where the "keys" are traffic class names, and the "values" are the strategy objects for that traffic class.

dscpFast and dscpNormal—the Differentiated Services Code Point numbers for the 'fast' and 'normal' paths.

Since the strategy and budget methods are encapsulated in separate objects, the main program can be fairly straightforward. For example, a method called by the main program to determine whether to upgrade the differentiated network service to critical or other selected traffic classes can be:

```
  def considerUpgrades( ):
    """
    Test whether each given traffic class should be upgraded to
      the fast link. The tests are:
    1) are we over our budget limit for the month already? If so,
      go no further.
    2) otherwise, call the ClassEval object, which makes the
      actual decision
    """
    global criticalClasses
    global fastLinkClasses
    global stateFileName
    global budget
    budget.update(criticalClasses)
    if not budget.allowMoreFastClasses( )
      return
    for className in criticalClasses.keys( )
      # if already upgraded, go on to the next
```

```
if fastLinkClasses.has_key(className):
    continue
cl=criticalClasses[className]
if cl.eval.considerUpgrade(cl):
    upgrade(cl)
    # remember we did this
    fastLinkClasses[cl.objName]=cl
    budget.addFastClass(className)
    writeState(stateFileName)
```

As the script above provides, the main program calls the 'budget' object to determine whether upgrades should be considered at all. If so, the main program considers all classes not already upgraded, and call their strategy objects ('cl.eval.considerUpdate'). The rest is just remembering what we did. The script above does not show operation on a periodic basis; rather it is assumed that the considerUpgrades object is called on some regular (user configurable) interval. In addition, each strategy module is responsible for determining when it wishes to consider upgrades or downgrades.

Furthermore, the following scripts actually implement the upgrades and downgrades according to an implementation of the present invention. In the implementation shown, the upgrade and downgrade scripts use the command line interface supported by administrator interface 150 to write the traffic management policies into the appropriate data structures. Of course other implementations are possible as well.

```
def upgrade(cl):
    # actually do the upgrade
    cmd="policy dscp+cl.objName+" "+str(state['dscpFast'])
    ps_cmd.issueCmd(cmd)
    return None def downgrade(cl):
    # actually do the downgrade
    cmd="policy dscp"+cl.objName+" "+str(state['dscpNormal'])
    return ps_cmd.issueCmd(cmd)
```

Note that "state" refers to a Python dictionary with one entry for each object to be pickled.

A.6. Operation

FIG. 4 illustrates a method, according to an embodiment of the present invention, directed to a flow-aware process that receives incoming flows, classifies them, and applies one or more traffic policies (such as a differentiated network service policy) based on the identified traffic class. As FIG. 4 illustrates, a packet processor 82 receives a data packet (202) and determines whether a flow object has already been created for the flow to which the data packet is a part (204). A flow object, in one implementation, is a data structure including fields whose values characterize various attributes of the flow, including source and destination IP addresses, port numbers, traffic class identifiers and the like. A flow object can also include other attributes, such as packet count, byte count, first packet time, last packet time, etc. If a flow object is not found, packet processor 82 constructs a new flow object (206). Packet processor 82 then determines whether the received packet is part of an existing flow or a new data flow (208). In typical network deployments, flows are generally TCP or UDP flows. However, any suitable transport layer flow can be recognized and detected. In one embodiment, flows are identified based on the following flow attributes: 1) source IP address, 2) destination IP address, 3) source port number, 4) destination port number, and 5) protocol (derived from the "protocol" field in IPv4 headers, and the "NextHeader" field in IPv6 headers). One skilled in the art will recognize that flows can be identified in relation to a variety of attributes and combinations of attributes. In addition, methods for determining new data flows and assigning packets to existing data flows are well known in the art and also depend on the particular transport layer protocol employed. For a TCP flow, for example, packet processor 82 can determine a new data flow by detecting SYN and/or SYN/ACK packets. However, a new data flow can simply be a data flow for which there is no corresponding flow object. For example, with UDP and GRE flows (where there is no explicit connection mechanism, such as SYN packets), a new flow is recognized by associating the source and destination addresses and port numbers to the flow, and the flow type (e.g., UDP, GRE, etc.). Accordingly, when a UDP packet identifies a new address/port pair, the attributes discussed above are stored in a data structure along with the time of last packet. A new UDP flow between the same address/port pairs can be determined by comparing the last packet time to a threshold value (e.g., 2 minutes). If the difference between the time of the latest packet and the time of the last packet is greater than the threshold, the new packet is deemed part of a new flow. In another implementation, a background and/or separate process can periodically compare the last packet times associated with a flow to a threshold period of time and deem the flow terminated if the last packet time is beyond the threshold period of time.

If the packet is part of an existing flow, the packet processor 82 associates the packet with the corresponding flow object and updates flow object attributes as required (210). For example, the packet processor 82, in one embodiment, increments the packet count associated with the flow, as well as the last packet time. If the packet represents a new data flow, traffic classification database 86 operates on the flow object and, potentially, attributes of the packet and other packets associated with the flow to determine a traffic type and/or traffic class associated with the flow (214). In one embodiment, the packet (or a pointer to the packet stored in a buffer structure) and the flow object (or a pointer thereto) is passed to the traffic classification database 86 to determine a traffic class. As discussed herein, identification of a traffic class or type can employ information gleaned from Layers 2 thru 7 of the OSI reference model. The determination of traffic classes is discussed in more detail at Sections A.1. and A.2., above. Similarly, if the packet represents a change to the data flow (212), packet processor 82 passes the packet and flow object to the traffic classification database 86 to determine the traffic class. Methods for determining changes to data flows are also well known in the art. For example, an email may include an attached digital image file. Accordingly, white the initial packets in the data flow may include simple text data, subsequent packets may contain image data. Packet processor 82, in one embodiment, is operative to detect such changes in the characteristics of the data flow by examining data encapsulated in upper layers of each packet, such as the detection of MIME types, etc.

As discussed above, to identify a traffic class associated with the data flow, packet processor 82 passes the flow object (or a pointer to the control block object) to traffic classification database 86. In one embodiment, the control block object or a copy of it is stored in association with the packet and in the same buffer structure to facilitate access to the control block object by traffic classification database 86. As discussed in more detail below, traffic classification database 86 operates on attributes of the flow object, (and potentially on the packet stored in the buffer structure) to identify traffic class(es) associated with the data flow (214). In one embodiment, the flow object includes a pointer to the identified traffic class(es) in traffic classification database 86. In one embodiment, the traffic classification database 86 stores in the flow object the differentiated service policy parameters, if any, associated with the identified traffic classes (216). As discussed above, the application performance analysis functionality discussed above monitors, in a separate process, the performance of network applications configured with a differentiated network service policy that allows for upgrades to network service if performance degrades below a specified threshold. Application traffic monitoring module 88 maintains the appropriate differentiated network services policy in traffic classification database 86, depending on the analyzed performance of the network application or other traffic class.

Packet processor 82 then passes the packet to traffic policy module 84 (222) which accesses the flow object corresponding to the data flow to retrieve differentiated service policies, if any, associated with the traffic class and enforces the identified traffic policy(ies) on the data packet flow. As FIG. 4 illustrates, measurement engine 140 also records or updates various measurement values associated with the packet to allow for analysis of bandwidth utilization and other network statistics on a traffic class or aggregate basis by traffic monitoring module 88.

As discussed above, traffic management device 130 can only effectively select differentiated services for outbound flows. However, as FIG. 1 illustrates, the use of first and second traffic management devices 130, 130a disposed at strategic points in the communication path between networks 40, 40a allow for the selection of differentiated network services in both the inbound and outbound directions for given network applications or other traffic classes. In one implementation, first and second traffic management devices 130, 130a may be configured to exchange application performance measurement data to coordinate the selection of differentiated network services for given network applications running between networks 40, 40a. In one implementation, traffic management devices 130, 130a are responsive to the differentiated service classes detected in inbound flows associated with a given traffic class from a given network, and adjust the service class applied to outbound flows of that traffic class to the same network. For example, as discussed above, traffic management devices 130, 130a can be configured with a hierarchical traffic classification configuration that includes a parent traffic class corresponding to networks 40a and 40, respectively, and child traffic classes of the parent class corresponding to different network applications or other traffic classes. FIG. 6 illustrates a method for coordinating the operation of traffic management devices 130, 130a given the traffic classification configuration set forth above. As FIG. 6 illustrates, after a traffic class is identified, application traffic monitoring module 88, in one implementation, can be configured to determine whether the packet represents an inbound flow from a known network (302). For example, traffic management device 130a can be configured to recognize inbound traffic from network 40 given appropriate IP address or subnet information. If the flow is an inbound flow from a known network, application traffic monitoring module 88 then determines whether the service class information in the inbound packet matches the current service class applied by traffic management device 130a to outbound flows for that traffic class (304). If the service classes do not match, application traffic monitoring module 88 then determines whether the service class applied to outbound flows associated with the given traffic class has been recently changed (306). For example, application traffic monitoring module 88 may compare the difference between the time the service class for the traffic class was last changed and the packet arrival time to a threshold period of time. This threshold comparison accommodates for the possibility that some packets, indicating the last service class, transmitted from network 40 may arrive after packets including the newly designated service class. If the service class associated with the outbound traffic class has not been recently changed, application traffic monitoring module 88 changes the service class for the outbound traffic class to the service class identified in the inbound packet (308). In one implementation, traffic monitoring module 88 also adjusts the state of the upgrade and/or downgrade objects, discussed above, as may be required (310). For example, if the service class has been upgraded, application traffic monitoring module 88 adds the traffic class identifier to the downgrade object such that it is now monitored for a possible downgrade when network conditions improve. In that instance, application traffic monitoring module 88, in one implementation, also removes the same traffic class identifier from the upgrade object. Oppositely, if the change represents a service downgrade, application traffic monitoring module 88 removes the traffic class identifier from the downgrade object and adds it to the upgrade object.

In one implementation, both traffic management devices 130, 130a analyze the performance of network applications, and include the coordination functionality illustrated in FIG. 6. A variety of configurations to coordinate operation of traffic management devices 130, 130a are possible. In one implementation, the application traffic monitoring functionality of traffic management device 130a, except for the coordination mechanism illustrated in FIG. 6, can be toggled off as to data flows transmitted between networks 40, 40a. This configuration allows the application performance measurements at traffic management device 130 to control the selection of differentiated network services for outbound and inbound data flows between networks 40, 40a for selected network applications.

B. Alternative Embodiments

FIG. 7 is a functional block diagram illustrating an application traffic management device 131 according to an alternative implementation of the present invention. As FIG. 7 illustrates, application traffic management device 131 shares some functionality with application traffic management device 130, discussed above. For example, application traffic management device 131 generally comprises network interfaces 71, 72 and application traffic management module 75. Application traffic management module 75, in one implementation, includes a packet processor 82, a traffic classification engine 86, a flow control module 84a, and network performance monitoring module 88a, and Class of Service (CoS) selector 89.

In the embodiment described below, application traffic management device 131 allows network administrators to configure minimum acceptable performance parameters (MAPPs) for one or more selected network applications. In one implementation, application traffic management device 131 stores the MAPPs for selected network applications in a MAPP table. Network performance monitoring module 88a actively tests CoS metrics (e.g., latency, jitter, packet loss, etc.) using so-called synthetic transactions with partner network devices having complementary functionality (such as network device 131a or 131b in FIG. 1B). As discussed more fully below, the packets transmitted during these synthetic transactions are marked with the different Classes of Service supported by the differentiated services network in order to evaluate the performance of each Class of Service over network 50. Network performance monitoring module 88a, in one implementation, also maintains a CoS Fitness Table which is an array or other data structure including values that characterize the degree to which the selected network applications meet the MAPPs. As CoS metrics change, network performance monitoring module 88a, changes the fitness values accordingly. As FIGS. 1B and 1C illustrate, application traffic management device 131 may operate in connection with a plurality of partner application traffic management devices 131a, 131b. As FIG. 1B illustrates, each of application traffic management devices 131, 131a, 131b may be connected to the same differentiated services network 50. As FIG. 1C illustrates, however, application traffic management devices 131 may be connected to application traffic management devices 131a, 131b through first and second differentiated services networks 50a, 50b, respectively. As FIG. 1C further illustrates, application traffic management device 131 may reach partner network device 131a using either first or second differentiated services networks 50a, 50b. As one skilled in the art will recognize, myriad network configurations are possible. In one implementation, network performance monitoring module 88a maintains separate CoS fitness tables for each partner network device 131a, 131b.

The CoS selector 89, in one implementation, is operative to selectively mark packets with the appropriate CoS markings based on the fitness values, if any, that apply to the packets. As discussed in more detail below, CoS selector 89, in some implementations, also includes functionality directed to handling situations where a given Class of Service is oversubscribed.

B.1. Monitoring of Differentiated Services Network Performance

As FIGS. 1A, 1B and 1C illustrate, the present invention may operate in a variety of network architectures. For example, as FIGS. 1B and 1C illustrate, application traffic management device 131 may operate to test path metrics to a plurality of partner network devices. As discussed in more detail below, the partner network devices can be manually configured or dynamically discovered.

B.1.a. Partner Device Configuration

In one implementation, application traffic management device 131 can be manually configured with the network address of one or more partner network devices (e.g., 131a) and corresponding network reachability information for the partner network device(s). For example, a network administrator, in one implementation, can configure application traffic management device 131 with the network address of application traffic management device 131a and the network addresses or subnet range(s) corresponding to the end systems connected to network 40a.

In another implementation, application traffic management device 131 can include functionality that dynamically probes for partner testing devices. For example, U.S. application Ser. No. 10/015,826 discloses technologies directed to dynamically probing for intermediate network devices along a communications path to an end host. One of ordinary skill in the art will recognize how to apply the probing functionality disclosed therein to discover partner testing devices, such as application traffic management devices 131a, 131b. In one implementation, network performance monitoring module 88a creates a CoS fitness table for each partner testing device that it is discovered. In addition, after discovery of a partner network device, network performance monitoring module 88a configures a synthetic transaction mechanism to test path metrics to the discovered device relative to available classes of service.

B.1.b. Class of Service Performance Monitoring

As discussed above, network performance monitoring module 88a, in one implementation, actively tests, for each class of service, path metrics to each partner network device. Network performance metrics, however, may be also based on passive monitoring schemes (analyzing actual network traffic), in addition to, or in lieu of, active monitoring. In one implementation, network performance monitoring module 88a uses synthetic transactions to actively test path metrics. That is, network performance monitoring module 88a transmits test packets addressed to partner network devices and computes metrics, such as latency, jitter and packet loss, based on the test packets and/or responses to the test packets.

As discussed more fully below, in one implementation, application traffic management device 131 can be configured to initiate synthetic transactions at periodic intervals to gather additional network CoS/path metric information in connection with partner network devices. The round-trip time measurements between application traffic management devices 131 and 131a can be used to assess SLA compliance for example, and/or obtain information that facilitates isolation of any potential network application performance issues to discrete network segments. In addition, one-way path metrics may also be obtained by using time stamps in the exchanged messages and synchronizing the time clocks on each partner network device.

In one implementation, synthetic transactions are similar to scheduled pings or SNMP polls. However, synthetic transactions can be configured to allow for detailed analyses of CoS metrics over time. Application traffic management device 131 can be configured to implement synthetic transactions involving a wide variety of network protocols, such as TCP, UDP, HTTP, HTTPS, POP3, SMTP, FTP, ECHO, and the like. In one implementation, using a web-based or command line interface, a synthetic transaction template can be configured with the following parameters:

1) <interval>: The repetition interval, if any, for the synthetic transaction;

2) <repeat>: The number of packets to transmit on the established TCP or other transport layer connection (default is 1);

3) <id>: A string that uniquely identifies the synthetic transaction; and

4) <url>: The type of transaction to issue, in the following format<type>://<host>{:<port>][/<path>], where <type> is http, https, pop3, smtp, ftp, echo, or custom; <host> is the DNS name or IP address of the desired host; <port> is the TCP port number to connect to; and <path> is additional information necessary for the request (such as a directory name or a file name, or cgi argument).

In one implementation, the http type will issue a GET request for the file specified by the <path> parameter. The https type does an SSL handshake and issues a GET request for the file specified by the <path> parameter. In one implementation, the smtp and pop3 types also do not send or receive mail; they issue a single command over the channel to elicit a response. The ftp type will issue a single retrieve command (RETR) for the file specified in the <path> parameter. The echo type sends a string to the designated host and the host echoes it back; in one implementation, it uses the echo protocol on port 7. The optional <path> argument has the format <length>[/<fill>] where <length> is the number of bytes to send on each request (the default is 512) and <fill> is a string to fill the request buffer. For example, the command "echo://test.domain.com/10/xyz" sends requests containing xyzxyzxyzx (10 bytes). The custom type allows users to specify a series of requests to be sent alternatively for as many messages as requested by the <repeat> parameter. The request strings are separated by the "|" character. For example, the command "custom: //10.7.15.8:25/ HELO|MAIL FROM:<bob>|RCPT TO: <brett>|DATA|hey|" sends a simple message to a mail server on port 25 (the default port for SMTP). In one implementation, the synthetic transactions used to test path metrics can use different protocols (e.g., SMTP, RTP, HTTP) to determine whether the performance of differentiated service network varies with protocol type.

Given the foregoing, a network administrator may for example configure a synthetic transaction template to send one or more packets to a partner network device for each class of service. For example, a synthetic transaction may be created that sends a message to the echo port (port 7, see RFC 862) of the partner network device. In another implementation, application traffic management device 131 can support a command, such as synthetic add <interval>[,<burst>] [id] "rtp://<host>[/<size>/<spacing>]", which sends bursts of <burst> UDP packets at intervals of <interval> minutes to the partner network device <host>. In one implementation, the <host> field is left blank to form a template for synthetic transactions to newly discovered partner network devices. In one implementation, the UDP packets look similar to RTP packets and have <size> payload bytes. The packets in the burst are separated by <spacing> milliseconds. To support testing of different classes of service, the synthetic transactions feature and command set can be expanded to allow for configuring various possible diffsery or other differentiated service markings or tags. In one implementation, a network administrator can define the markings using the following commands:

synthetic markings add <mark> <dscp-value>.
synthetic markings add <mark> <mark1>,<mark2>[, . . . ]
synthetic markings delete <mark>
synthetic markings show [<mark>[, . . . ]]

A network administrator may use the command set as in the following example to add the gold, silver and bronze classes of service.

synthetic markings add gold 12
synthetic markings add silver 15
synthetic markings add bronze 19
synthetic markings add low bronze,silver
synthetic markings add high silver,gold A network administrator can then specify that a given synthetic transaction is to be transmitted with a selection of markings to allow an assessment of the performance of each class of service. In one implementation, the following commands are provided:

synthetic mark <id> <mark>
synthetic mark <id> none

Using these command, the following configuration can be implemented.

synthetic add 10,15 ps99 rtp://<ps99.example.com>/64/30
synthetic mark ps99 low

The above commands schedule a transaction every 10 minutes that would send 15 "real-time" packets of size 64 bytes spaced 30 milliseconds apart. Each transaction would be sent twice with the two DSCP marks—silver and bronze. To support the computation of various performance metrics, each of the test packets can contain a variety of information. For example, in one implementation, the payload of each test packet can include the following: 1) a magic number (for confirmation or validation); 2) type (outbound=1 vs. inbound=3); 3) transaction ID; 4) Network Time Protocol (NTP) time stamp; 5) burst size (number of packets); 6) packet number (within burst); 7) differentiated service marking value; 8) payload size; and 9) spacing.

The receiving partner network device can record various metrics, as well as packet arrival times, gleaned from receipt of the packets and transmit them to application traffic management device 131 in a response. In one implementation, a receiver process in the partner network device analyzes the packets in a burst, and after gathering the last packet of the burst (or a timeout in case that one is lost) returns a results packet back to the originating application traffic management device 131. In one implementation, the results packet or message contains: 1) the magic number (for confirmation); 2) type (results=2); 3) transaction ID; 4) average one-way delay; 5) average jitter; and 6) average packet loss (over burst). In one implementation, application traffic management device 131 stores the resulting metrics in a data structure.

In one implementation, when the partner network device on the far end receives the first packet (which may not necessarily be number 1) of a burst, it initiates the same transaction (same delay and size parameters, same DSCP marking) with the same transaction ID back to the originating application traffic management device 131, but with transaction type set to "inbound". The originating application traffic management device computes the same jitter, delay, and loss numbers, storing them in data structure. To compute one-way delays, both application traffic management device 131 and the partner network device, in one implementation, are synchronized to the same UTC clock. In one implementation, this is accomplished by configuring the devices with an NTP client. Global Positioning System (GPS) technology can provide another mechanism for synchronizing system clocks across partner network devices. In other configurations, application traffic management device 131 can be configured to open a TCP connection with each partner network device and transmit a set number of packets. As one skilled in the art will recognize, a wide variety of testing configurations can be implemented.

In one implementation, network performance monitoring module 88a is configured to execute the synthetic transactions for each Class of Service supported by network 50. In one implementation, after a network administrator has configured a synthetic transaction, network performance monitoring module 88a executes the specified synthetic transaction for each Class of Service by marking the outgoing packets accordingly. In implementations where partner devices are dynamically discovered, network performance monitoring module 88a can automatically configure synthetic transactions for the newly discovered partner device based on the synthetic transactions template configured by the network administrator.

In one embodiment, to analyze synthetic transactions separately from other network traffic, the synthetic transactions may have their own traffic classes configured in traffic classification engine 86. In one implementation, a user, using administrator interface 150, may enter commands to create one or more synthetic transactions traffic classes distinct from network traffic. In one implementation, a separate synthetic transaction traffic class is created for each partner network device to which test packets are transmitted. For example, if a network administrator creates more than one synthetic transaction for a given host, all transactions are classified in a single class. For instance, suppose a user creates an echo transaction to 65.17.12.125 and an http transaction to 65.17.12.125, application traffic management device 130 may create a single class, SyntheticTransactions/65.17.12.125, and classify the echo and http transactions in this class. Of course, other traffic classification schemes can be implemented. For example, child traffic classes can be configured based on the Class of Service corresponding to the test packets.

In one implementation, network performance monitoring module 88a maintains for each class of service the following performance metrics: 1) latency, 2) jitter, and 3) packet loss. In one implementation, network performance monitoring module 88a maintains these metrics as a moving average, weighted moving average, or exponential moving average to smooth out rapid changes in the metrics. In one implementation, network performance monitoring module 88a also maintains the "old" performance metrics that were used to compute the latest fitness values for the CoS/partner device pair, and a metric time stamp corresponding to the time the old performance metrics were computed.

FIG. 8 illustrates a process flow, according to one implementation of the present invention, directed to monitoring the performance of the classes of services over a differentiated services network and conditionally re-computing the application/CoS fitness table. In one implementation, after network performance monitoring module 88a receives responses to the synthetic transactions for a given class of service it initiates (402), it stores the current metrics (latency, jitter, packet loss) for the class of service (404). In one implementation, if the metric time stamp for the class of service is a null value (meaning it has not been tested previously) (405), network performance monitoring module 88a saves the computed metrics in a CoS table and sets the metric time stamp (410), and computes the application/CoS fitness table corresponding to the partner network device (412). In one implementation, if the difference between the current time and the metric time stamp is greater than the threshold (Th1) (406), and the difference between the old metric and the current metric is greater than a threshold (Th2) (408), network performance monitoring module 88a saves the metrics as the "old" metrics and resets the metric time stamp (410). Network performance monitoring module 88a re-computes the application/CoS Fitness Table for the partner network device (412), as discussed more fully below. In one implementation, each of the current metrics (latency, jitter and packet loss) are compared to the corresponding old metrics. The threshold (Th2) can therefore vary depending on the metric type being evaluated.

B.1.c. Application Performance Specification (MAPPs)

In one implementation, a user enters certain information about expected or desired network application performance as to one or more network applications. In one implementation, the user also describes the classes of service, if any, supported by one or more network service providers. In one implementation, the user first identifies the network applications (and optionally defines application groups) that are relevant to a given enterprise. For each identified network application, the user then configures Minimum Acceptable Performance Parameters (MAPP), which may comprise one to a combination of the following: 1) maximum acceptable latency; 2) maximum acceptable jitter or latency variation; 3) maximum percentage of packets dropped per second; and 4) maximum number of packets dropped over a time interval.

In one implementation, a Minimum Acceptable Performance Parameter (MAPP) table is constructed that specifies the minimum performance requirements of each application. In one implementation, separate MAPP tables can be configured for particular network device pairs (e.g., application traffic management devices 130, 130a) connected to the differentiated service provider network 50. The following provides, for didactic purposes, a MAPP table according to one implementation of the present invention.

| MAPP Table | | | |
|---|---|---|---|
| Application | Max Latency | Max Pkt Drp % | Max Jitter |
| Web Browsing | | | |
| Instant Msngr | | | |
| FTP | | | |
| E-Mail | | | |
| Bugsy | 100 millisecs | | |
| VoIP | 30 millisecs | 0.5% | 10 millisecs |
| Video Stream | 200 millisecs | 2% | 100 millisecs |
| Citrix | 50 millisecs | | |

In one implementation, the user also defines the Classes of Service supported by a given network. The following table illustrates one possible configuration defining three Classes of Service.

| Classes of Service - ISP1 | | | | |
|---|---|---|---|---|
| Service Class | Bandwidth % | Max Latency (msecs) | Max Pkt Drp % | Max Jitter (ms) |
| Gold | 30 | 10 | 0.6% | 10 |
| Silver | 30 | 100 | 1% | 40 |
| Bronze | 40 | 400 | 2% | 200 |

In addition, the user, in one implementation, also defines the amount of bandwidth allocated to each Class of Service over the corresponding access link 21. This allocation can be expressed as a percentage of the total available bandwidth, or as an absolute bandwidth value. In a manual model, the user would have to configure the desired CoS for one or more selected network applications. However, with the dynamic mapping functionality of the present invention, application traffic management device 131 decides how data flows corresponding to different network applications are marked, depending upon the current state of the CoS, the current network application usage, and the classes of service that can be used to reach the destination hosts.

Furthermore, in some implementations, an enterprise network may have connectivity to additional network service providers. The following is a separate Classes of Service table illustrating the supported Classes of Service for a second, hypothetical network service provider (see also FIG. 1C).

| Classes of Service - ISP2 | | | | |
|---|---|---|---|---|
| Service Class | Bandwidth % | Max Latency (msecs) | Max Pkt Drp % | Max Jitter (ms) |
| Green | 20 | 20 | 0.2% | NA |
| Yellow | 40 | 40 | 0.5% | NA |
| Red | 40 | 80 | 1.2% | NA |

In this circumstance, there may be multiple paths between two hosts (as illustrated in FIG. 1C). In one implementation, the application traffic management device 131 uses an indirection table that maps diffsery markings to ISP/CoS pairs to allow routing devices (e.g., router 22) to select the desired path for the data flows. The following is an example of an indirection table given the Classes of Service tables for ISP1 and ISP2, above.

| Indirection Table | | |
| --- | --- | --- |
| DSCP | ISP | CoS (Marking) |
| 11 | ISP1 | Gold (27) |
| 12 | ISP1 | Silver (33) |
| 13 | ISP1 | Bronze (25) |
| 10 | ISP1 | Best Effort (0) |
| 21 | ISP2 | Green (18) |
| 22 | ISP2 | Yellow (19) |
| 23 | ISP2 | Red (1) |
| 20 | ISP2 | Best Effort (0) |

In one implementation, application traffic management device 131 uses the DSCP marking to specify to the router which ISP and CoS to use for the packets. From the same information in the indirection table, a network administrator also configures the router(s) to map the DSCP markings to 1) the correct egress interface for the selected ISP, and 2) the correct tag or marking used by that ISP for the desired class of service. Furthermore, the dynamic partner discovery functionality discussed above can be used to discover partner network devices for different network destinations. The synthetic transaction functionality discussed above can be used to discover which indirect (DSCP) markings (and thus, the network paths) can be used to reach a given network destination and how well each path/CoS pair performs. In one implementation, this network reachability information can be stored in host database 134 in association with a corresponding network address.

In addition, the router 22 can be configured to allow application traffic management device 131 to deduce which ISP link is the preferred route to a given network destination. That is, router 22 can be configured to mark incoming packets to indicate from which ISP link the packet came. This marking can take the form of an MPLS label, an MPLS "experimental bit" setting, or a DSCP value. The following illustrates how a Cisco® router can be configured to mark traffic from two interfaces with different multihome tags using the DSCP method.

interface Ethernet3/0
ip address 172.21.18.222 255.255.0.0
no ip directed-broadcast
no ip mroute-cache,
ip policy route-map isp-1
no cdp enable
!
interface Ethernet3/2
ip address 172.25.18.222 255.255.0.0
no ip directed-broadcast
no ip mroute-cache
ip policy route-map isp-2
no cdp enable
!
route-map isp-2 permit 20
set ip precedence 2
set ip tos 8
!
route-map isp-1 permit 10
set ip precedence 1
set ip tos 4 !

The foregoing commands correspond to a network environment where the interfaces of the router are Ethernet interfaces. One skilled in the art, however, will recognize that a variety of wide area network interface types can be used, and how to configure the router for such interfaces. In addition, since Cisco's current IOS does not allow a user to specify a DSCP value directly in the "set" command, it is separately computed from the following formula: DSCP=(precedence*16+tos)/2. Accordingly, the above example marks "ISP-2" traffic with DSCP 20 and "ISP-1" traffic with DSCP 10. In addition, application traffic management device 131 must also be configured to recognize packets marked by the router 22 as to their origin ISP network. In one implementation, application traffic management device supports the following commands:

setup multihome dscp <min>-<max>
setup multihome mpls-label <min>-<max>
setup multihome mpls-exp <min>-<max>
setup multihome none The foregoing command set allows a network administrator to specify the type of marking and the range of values used to indicate the origin ISP (e.g., setup multihome dscp 5-7 for links to 3 ISPs). Note that the <min> value is greater than zero. It is also not required to mark packets from all ISP links; for example, in one deployment, a router could just mark "ISP2" packets and leave unmarked packets to be associated with ISP1 by default. However, this scheme may not be preferred if incoming packets are marked with DSCP tags, as existing tags (if not overwritten) may be taken for multihome markings.

When the application traffic management device 131 receives a marked packet, it remembers the mark in the flow object and in host database 134 for the sending IP address and removes the mark from the packet before further classification. For example, application traffic management device 131, in one implementation, can pop an MPLS label in the "multihome" range and classification would then happen on the next label in the stack. "Removing" a legacy DSCP-type mark is done by setting it to zero. This remembered information can then be used to identify a differentiated services network that can be used to reach a destination host for a given data flow.

Application traffic management device 131 can then use the matching rule fragment . . . {all|inside|outside} multihome:<mark> . . .

with <mark> being one of the numeric values in the "setup multihome" range. For inbound packets, classification looks at the mark in the flow object; for outbound it assumes the border router 22 will send back the packet using the same link as the reverse flow is using and looks up the mark from the host database entry for the destination address. Given the foregoing router configuration, the corresponding configuration commands, to allow for recognition of the multihome markings, for application traffic management device 131 would be:

setup multihome dscp 10-23
class new /Inbound ISP-1 inside multihome:10
class new /Inbound ISP-2 inside multihome:20
class new /Outbound ISP-1 outside multihome:10
class new /Outbound ISP-2 outside multihome:20.

Other methods for obtaining network reachability information can be used. For example, application traffic management device 131 may obtain BGP or other routing information to determine which networks have reachability to different destination hosts. This routing information can be processed against the entries in the host database 134 to identify available differentiated services networks for different destination hosts.

B.1.d. Application/CoS Fitness

As discussed above, network performance monitoring module 88a maintains, for each partner network device, an application/CoS fitness table or array whose elements characterize the degree to which the monitored performance of a given class of service will satisfy the requirements of a network application. In one implementation, network performance monitoring module 88*a* computes a fitness value that ranges between −1 and 1, where −1 indicates the a class of service is not sufficient to satisfy the requirements of a network application, 1 indicates that a class of service is more than sufficient to satisfy the requirements of a network application, and 0 indicates that a class of service exactly matches the requirements of a network application. In one implementation, network performance monitoring module 88*a* computes a fitness value for each metric type (e.g., latency, jitter and packet loss), if included in the MAPP table, and then selects the minimum fitness value for each metric type as the overall fitness score. The following table illustrates a formula, according to one implementation of the invention, for computing a fitness value. For didactic purposes, assume that Lr is the maximum latency requirement specified in the MAPP table for a given network application, and Lo is the observed latency for a given class of service on a particular path between partner devices.

| Fitness Value Scoring | |
|---|---|
| Formula | Fitness Value |
| Lo < Lr | (Lr ~ Lo)/Lr |
| Lo = Lr | 0 |
| Lo > Lr | (Lo ~ Lr)/Lo |

The fitness values for jitter and packet loss can be computed in a similar manner. In addition, in other implementations, the fitness value can be computed based on an aggregate or weighted aggregate of the fitness values for each metric type. In addition, the fitness value scoring algorithm set forth above represents one of many possible scoring algorithms. As discussed more fully below, CoS selector 89 looks up the overall fitness values in determining how to mark outgoing packets.

B.3. Dynamic CoS Assignment to Data Flows

B.3.a. Initial Configuration

After the MAPP and CoS tables are configured, application traffic management device 130 may initially compute fitness values for each CoS based on the performance guarantees specified in the CoS tables. These initial fitness values will then change when testing data from the synthetic transactions discussed above are received.

B.3. b. Dynamic CoS Selection

CoS selector 89 can operate in a variety of manners to dynamically assign network application traffic to suitable classes of service. In one implementation, CoS selector 89 can operate on an aggregate basis to change the CoS marking corresponding to the network application applied by flow control module 84, as discussed above. However, as discussed below, CoS selector 89 can operate on a flow-by-flow basis to select and mark the packets of a data flow with a class of service.

Figure 9:
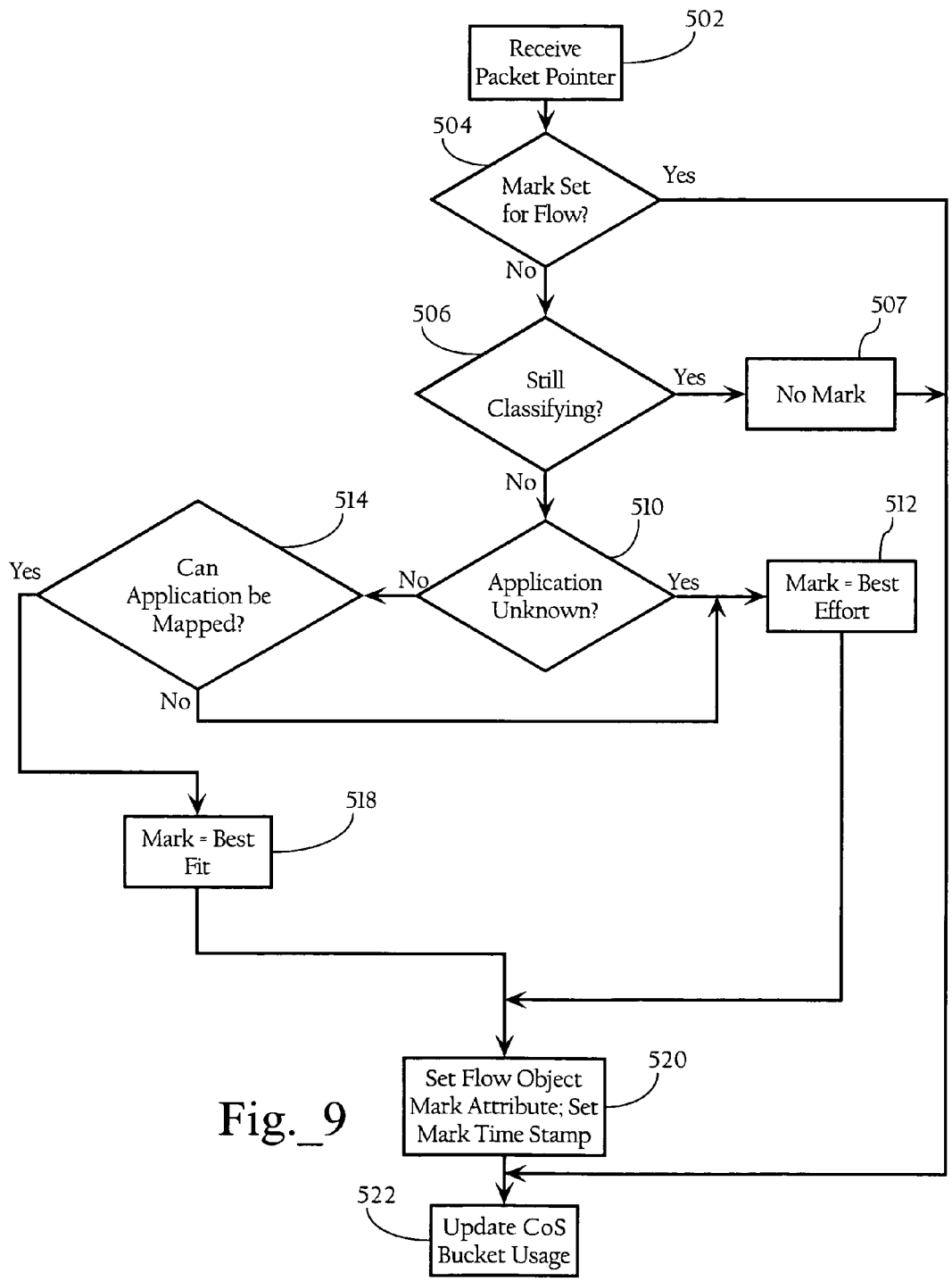
FIG. 9 is a flow chart diagram providing a method, according to an implementation of the invention, directed to assigning a class of service to a data flow.

FIG. 9 illustrates a process flow, according to one implementation of the present invention, directed to a process for initially selecting a Class of Service for data flows traversing application traffic management device 131. As discussed above, CoS selector 89, in one implementation, operates at a point in the packet processing path after traffic classification engine 86 identifies a service type, and prior to a process that places packets onto a transmit queue of a network interface.

The process illustrated in FIG. 9 operates on a packet-by-packet basis and accounts for the situation that a network application may not be identified until multiple packets in the data flow have been encountered. As FIG. 9 illustrates, when CoS selector 89 receives a pointer to a packet buffered in memory (502), it determines whether the flow object corresponding to the packet already includes a CoS identifier (504). As discussed above, a flow object is created for each data flow, to support the CoS marking functionality described herein, each flow object includes the following attributes: 1) current CoS marking; 2) a mark time stamp, 3) MAPP table entry corresponding to the network; and 4) pointers to the current fitness values, if any, for each CoS that can be used to reach the destination host. As discussed above, the flow object may also include other attributes, such as service type identifiers corresponding to a network application, or traffic class identifiers and the like. In one implementation, these flow object attributes are null values until they are set.

As FIG. 9 illustrates, CoS selector 89 does not set a class of service for the flow object until the traffic classification engine 86 has finished classifying the data flow (506). As discussed above, the classification of data flows may involve the inspection of a number of packets before a network application can be determined. In some instances, it therefore may take a number of packets before it can be determined whether a network application can be identified and, if so, the identity of that network application. Accordingly, until a network application is identified or all classification is exhausted, CoS selector 89 does not set a class of service for the data flow. In this situation, the packets are transmitted without class of service markings or transmitted using a best efforts service (without setting a mark attribute in the flow object) (507). However, if a network application is known or all traffic classification has been exhausted (510), CoS selector 89 operates to select a class of service for the data flow. In the implementation illustrated in FIG. 9, CoS selector selects the class of service to a "best effort" class for unknown network applications (512), and sets the CoS marking attribute in the flow object to the selected CoS and the mark time stamp in the data flow to the current time (520). CoS selector 89 then updates one or more statistics relating to the usage of the selected class of service (522). For example, CoS selector 89 adds a pointer to the flow object in a CoS bucket data structure. The CoS bucket data structure, in one implementation, maintains the flow object pointers in a sorted list ordered by fitness value.

As FIG. 9 illustrates, if a network application is identified (510), CoS selector 89 looks up the network application in the MAPP table to determine whether the network application can be currently mapped to a class of service (514). For example, if the MAPP table does not contain the network application, or does not include any minimum performance requirements, the network application cannot be mapped to a class of service. Similarly, if no service level agreement offers a class of service that supports the minimum requirements of a network application, it cannot be mapped to a CoS. For example, assume for didactic purposes that a network application in the MAPP table requires a minimum jitter (e.g., 7 milliseconds) and that no class of service provides performance guarantees relative to jitter (such as the green, yellow and red classes of service set forth above). In these cases, CoS selector 89, in one implementation, sets the class of service to best effort (512). If the identified network application has a MAPP table entry, however, CoS selector 89 determines the best fit for the network application (518). The selection of the best fitting class of service for a given network application depends on the implementation. As discussed above, network performance monitoring module 88*a*, in one implementation, is operative to periodically test the performance of each class of service to each partner network device and re-compute the fitness values for each network application in the MAPP table. In such an implementation, finding the best fitting class of service involves searching the array of fitness values, corresponding to the partner network device having reachability to the destination host identified in the packet, for the fitness value closest to zero and positive (if any positive values exist; otherwise, the closest to zero), given the fitness scoring algorithm discussed above. In some situations, however, a partner network device for the destination end point may not have been identified. For example, a network administrator may not have configured application traffic management device 131 with the requisite partner device information. Alternatively, application traffic management device 131 may not have completed the process of dynamically discovering the partner network device and the subsequent testing of the path to it. In this instance, CoS selector 89, in one implementation, may select the a class of service based either on the attributes of the contracted SLA performance across network 50 or use a best effort class of service.

As one skilled in the art will recognize, the initial selection of a class of service for a data flow as described above operates, in one implementation, without regard to the load or bandwidth utilization of each class of service. In one implementation, CoS selector 89 includes a separate process that operates periodically to alter the class of service applied to existing data flows based on observed loading conditions and/or detected MAPP failures. In one implementation, a MAPP failure occurs when the observed performance of a class of service falls below a MAPP parameter corresponding to a network application to which the CoS was mapped. In one implementation, the current fitness value for the flow would fall below zero. FIG. 10 illustrates a process flow, which CoS selector 89 executes on a periodic basis to adjust the classes of service initially selected for one or more data flows. As FIG. 10 illustrates, CoS selector 89 operates on a periodic basis (602) to determine whether any flows are currently assigned to a class of service that does not meet the MAPPs associated with the network application corresponding to the data flow (604). In one implementation, a MAPP failure is determined relative to the current fitness value associated with the class of service to which the data flow is assigned. In addition, CoS selector 89 also checks to see whether the observed load on any given class of service exceeds a threshold toad value (620).

As discussed above, network application performance monitoring module 88*a* monitors network application performance and updates the fitness values for each class of service. Accordingly, the latest observed performance for a given class of service may fall below the MAPPs specified for a given network application after one or more flows have been marked with that class of service. Accordingly to detect a MAPP failure (604), CoS selector 89, in one implementation, looks up the current fitness value associated with the current class of service corresponding to each data flow. Given the fitness scoring algorithm set forth above, a fitness value that is less than zero indicates a MAPP failure. If there are no MAPP failures, CoS selector 89 then analyzes the observed load associated with each class of service that provides a minimum guarantee relative to at least one performance metric (see below). Otherwise, CoS selector 89 selectively changes the CoS marking for one or more of the data flows where the fitness value is less than zero (608). In one implementation, a data structure maintains data flow identifiers sorted by their current fitness value where the data flow with the lowest fitness value appears first. Accordingly, CoS selector 89 starts with the data flow having the lowest fitness value and proceeds to selectively re-map flows that have a negative fitness value. As FIG. 10 illustrates, CoS selector 89, in one implementation, first determines whether any class of service that could be applied to the data flow has a fitness value better than the fitness value of the current class of service (609). If so, CoS selector 89 then determines whether the CoS marking for a given data flow has been changed within a threshold period of time (Th3) (610). If so, CoS selector 89 does not change the CoS marking for the data flow; otherwise, CoS selector 89 selects the new best fitting class of service for the data flow and sets the mark time stamp (612). This threshold time check is intended to avoid rapid changes to the CoS marking applied to any given data flow. Indeed, repeated changes to the CoS marking may cause, for example, out of order packet transmissions, which for RTP flows may be problematic to operation of the network application executed between the end systems.

To prevent oversubscription of a given class of service, CoS selector 89 also checks the observed load for each class of service. In many deployment scenarios, the available bandwidth across access link 21 is allocated to each class of service in some pre-determined amount. For example, each class of service may be allocated a fixed share of the available bandwidth as set forth in the tables above. Accordingly, the selection of classes of service in the aggregate may result in oversubscription of one or more of the classes of service. As FIG. 10 illustrates, CoS selector 89 operates to adjust the CoS markings for one or more data flows to prevent oversubscription. In one implementation, this functional aspect of CoS selector 89 only operates on classes of service that provide a minimum guarantee relative to at least one performance metric (e.g., latency, jitter, packet loss), and does not operate on classes of network service that do not provide minimum guarantees, such as a best effort class of service. In one implementation, if the load for any given class of service exceeds a threshold percentage (Th4) (620), CoS selector 89 operates to adjust the class of service applied to one or more data flows in that CoS bucket. In one implementation, CoS selector 89 orders the classes of service that exceed the threshold by load with the most loaded CoS bucket first (622). CoS selector 89, for each "full" CoS bucket (i.e., where the observed load exceeds Th4) (624), re-marks the data flows in the CoS bucket with the least loaded class of service that meets the MAPPs corresponding to the network application (632). If no available CoS currently meets the MAPPs associated with the flow, then the CoS assigned to the flow is the most qualified (i.e., CoS with highest fitness value) and least loaded CoS bucket. In one implementation, the CoS selection can be based on a weighted algorithm that combines fitness values and load parameters. CoS selector 89 proceeds through the flows in the CoS Bucket until the projected load on the CoS Bucket falls below a second threshold percentage (Th5) (626, 628, 634). In one implementation, CoS selector 89, similar to above, does not change the class of service applied to a given flow if it had been changed within a threshold period of time (Th3) (630).

Lastly, although the present invention has been described as operating in connection with end systems and networks primarily employing the HTTP, TCP and IP protocols, the present invention has application in computer network environments employing any suitable session layer, transport layer and network layer protocols. Moreover, one skilled in the art will recognize that the present invention can be applied to dynamically adjust a variety of differentiated services policies, such as MPLS, diffserv, and the like. In addition, although embodiments of the present invention discussed above operate to upgrade a given traffic class, embodiments of the present invention can be configured to downgrade or otherwise change a differentiated service class that would ordinarily apply to a given traffic class if the detected performance falls below a given threshold. For example, the present invention can be configured to downgrade data flows that, by default, receive a higher class of service, if during an analysis interval it is determined that the particular class of service is not having the desired effect on application performance, as indicated by response time measurements discussed above. Accordingly, the present invention has been described with reference to specific embodiments. Still further, one skilled in the art will recognize that a variety of service level agreements exist. The forgoing description is intended to illustrate how various embodiments of the present invention operate in connection with different service level agreement types. For example, the details of other flow assignment and adjustment schemes will depend on the attributes of the service level agreements applicable to a given network service provider. For example, assuming that a service level agreement specifies the cost of different classes of service but does not provide for a fixed allocation of the link bandwidth, CoS selector 89 can be configured to select the least-cost class of service for a data flow where the fitness value of the class of service is greater than zero. If no class of service has a fitness value greater than 0 for a given data flow, CoS selector 89 selects the class of service that has a fitness value closest to 0. Other embodiments of the present invention will be apparent to one of ordinary skill in the art. It is, therefore, intended that the claims set forth below not be limited to the embodiments described above.

What is claimed is:

1. An apparatus facilitating the management of network traffic transmitted over a differentiated services network supporting one or more classes of service, comprising
    a packet processor operative to
        detect data flows in network traffic traversing a communications path, the data flows each comprising at least one packet;
    a traffic classification engine operative to identify one or more network applications in data flows traversing the apparatus,
    a network performance monitoring module operative to monitor the performance of the differentiated services network relative to the one or more classes of service supported by the differentiated services network; and,
    a class of service (CoS) selector operative to
        compute, for at least one of the network applications, fitness values for the one or more classes of service based on the respective minimum acceptable performance parameters associated with corresponding network applications and the monitored performance of the one or more classes of service supported by the differentiated services network,
        select a class of service from the one or more classes of service for a given data flow based on the identified network application, and a comparison between the fitness values for each of the classes of service corresponding to the identified network application, and
    wherein the apparatus is operative to mark the packets of the data flows based on the identified network applications and the selected classes of service, and transmit the packets over the differentiated services network.

2. The apparatus of claim 1 wherein the CoS selector is further operative to adjust the selection of the class of service for one or more data flows based on changes in performance of the one or more classes of service.

3. The apparatus of claim 1 wherein the CoS selector is further operative to adjust the selection of the class of service for one or more data flows based on the observed load corresponding to the one or more classes of service.

4. The apparatus of claim 1 wherein the network performance monitoring module is operative to test the performance of the one or more classes of service relative to at least one of the following: latency, jitter and packet loss.

5. The apparatus of claim 1 wherein the network performance monitoring module is further operative to discover partner network devices disposed at the edge of the differentiated services network and in the communications path to one or more destination hosts.

6. The apparatus of claim 5 wherein the network performance monitoring module is operative to test the performance of the one or more classes of service supported by the differentiated services network in cooperation with at least one discovered partner network device.

7. The apparatus of claim 6 wherein the network performance monitoring module is operative to
    transmit, at periodic intervals, a burst of packets to the partner network device, wherein the packets in the burst of packets are spaced at a uniform time interval;
wherein the partner network device is operative to
    receive the burst of packets from a first network device and measure at least one network performance attribute based on receipt of the burst of packets; and
    transmit a response packet to the apparatus with the at least one network performance attribute.

8. The apparatus of claim 7 wherein the at least one network performance attribute is selected from the group consisting of latency, jitter, and packet loss.

9. The apparatus of claim 7 wherein the apparatus and the partner network device each comprises a time synchronization mechanism.

10. A system facilitating the management of network traffic transmitted over a plurality of differentiated services networks, each differentiated services network supporting one or more classes of service, comprising
    an application traffic management device comprising
        a packet processor operative to
            detect data flows in network traffic traversing a communications path, the data flows each comprising at least one packet;
        a traffic classification engine operative to identify one or more network applications in data flows traversing the apparatus,
        a network performance monitoring module operative to monitor the performance of the one or more classes of service supported by the differentiated services networks; and,
        a class of service (CoS) selector operative to
            compute, for at least one of the network applications, fitness values for the one or more classes of service based on the respective minimum acceptable performance parameters associated with corresponding network applications and the monitored performance of the one or more classes of service supported by the differentiated services network,
            select a differentiated services network from the plurality of differentiated services networks and a class of service from the one or more classes of service supported by the selected differentiated services network for a given data flow based on the identified network application, and a comparison between the fitness values for each of the classes of service corresponding to the identified network application, and wherein the application traffic management device is operative to mark the packets of data flows corresponding to the given network application with a mark corresponding to the selected differentiated services network and the selected class of service; and a router operatively connected to the plurality of differentiated services networks, the router operative to
receive packets with the mark from by the application traffic management device;
map the mark to a first differentiated services network from the plurality of differentiated services networks and the class or service from the one or more classes of service supported by the first differentiated services network.

11. The system of claim 10 wherein the router, as to inbound packets, is further operative to mark the inbound packets with an identifier corresponding to the differentiated services network from which the inbound packets are received.

12. The system of claim 10 wherein the application traffic management device is operative to store identifiers in association with the source hosts of the inbound packets, and use the stored identifiers when selecting the differentiated services network for the given data flow.

13. The apparatus of claim 10 wherein the CoS selector is further operative to adjust the selection of the class of service for one or more data flows based on changes in performance of the one or more classes of service.

14. The apparatus of claim 10 wherein the CoS selector is further operative to adjust the selection of the class of service for one or more data flows based on the observed load corresponding to the one or more classes of service.

15. A method, comprising
detecting, at a network device connected to a communications path, data flows in network traffic traversing the communications path, the data flows each comprising at least one packet, and wherein the communications path comprises a differentiated services network supporting one or more classes of service;

identifying one or more network applications in the data flows traversing the communications path, monitoring the performance of the differentiated services network relative to one or more classes of service supported by the differentiated services network; and, computing, for at least one of the network applications, fitness values for the one or more classes of service based on the respective minimum acceptable performance parameters associated with corresponding network applications and the monitored performance of the one or more classes of service supported by the differentiated services network, selecting a class of service from the one or more classes of service for a given data flow based on the identified network application, and a comparison between the fitness values for each of the classes of service corresponding to the identified network application and marking the packets of the data flows corresponding to the given network application with the selected class of service for transmission over the differentiated services network.

\* \* \* \* \*

UNITED STATES PATENT AND TRADEMARK OFFICE
CERTIFICATE OF CORRECTION

| | | |
|---|---|---|
| PATENT NO. | : 7,843,843 B1 | Page 1 of 1 |
| APPLICATION NO. | : 11/096310 | |
| DATED | : November 30, 2010 | |
| INVENTOR(S) | : Albert L. Papp, III et al. | |

It is certified that error appears in the above-identified patent and that said Letters Patent is hereby corrected as shown below:

In title, after "Selection of" please delete "Differntiated" and insert --Differentiated--.

Signed and Sealed this
Twenty-third Day of August, 2011

David J. Kappos
*Director of the United States Patent and Trademark Office*